United States Patent Office 3,723,096
Patented Mar. 27, 1973

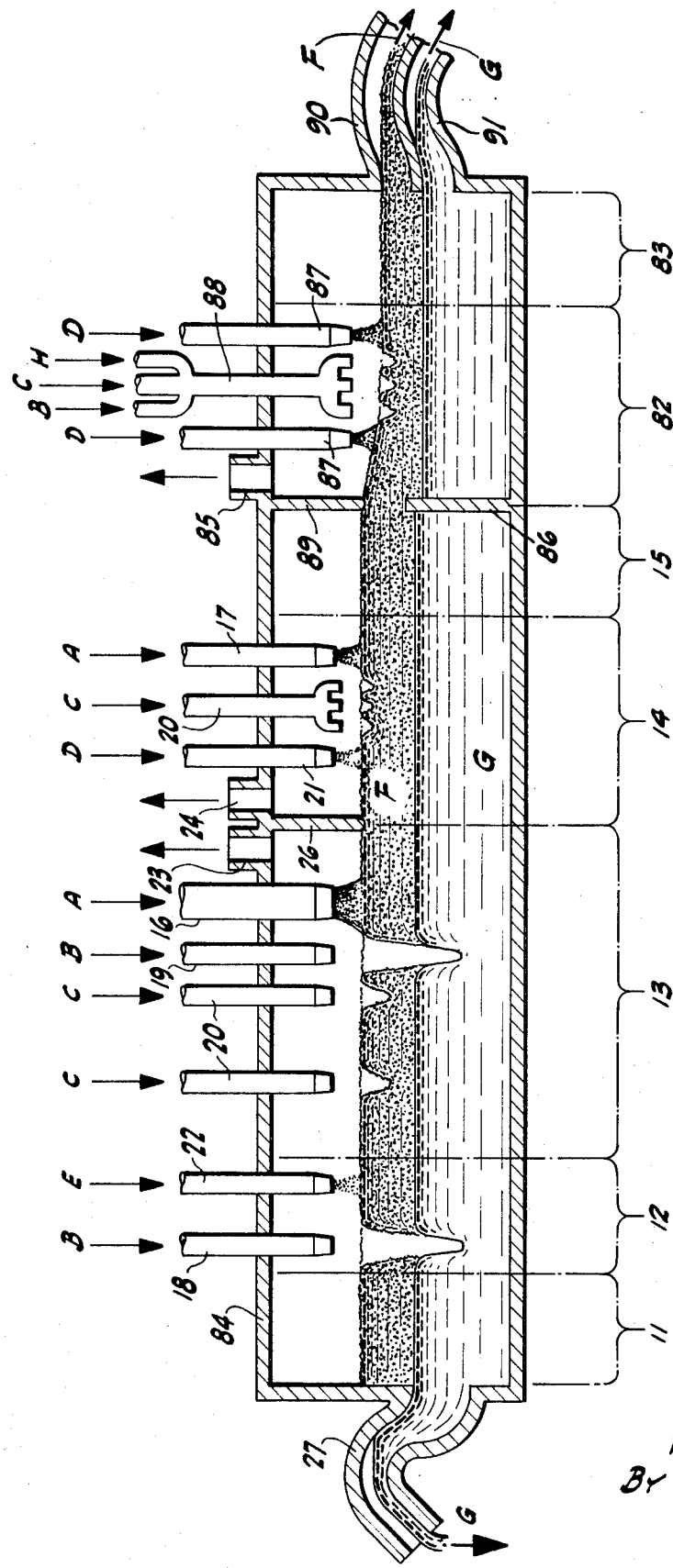

3,723,096
PRODUCTION OF METALS FROM
METALLIFEROUS MATERIALS
Norman A. D. Parlee, Los Altos Hills, Calif., and William E. Mahin, Ashland, Oreg., assignors to Kaiser Industries Corporation, Oakland, Calif.
Continuation-in-part of abandoned application Ser. No. 22,766, Mar. 26, 1970. This application Nov. 9, 1970, Ser. No. 88,023
Int. Cl. C21b 15/00; C22b 7/00
U.S. Cl. 75—21
50 Claims

ABSTRACT OF THE DISCLOSURE

In a furnace system, a process for separating and recovering a desired metal element from metalliferous materials, such as ores and alloys. A liquid slag phase of the oxides of the desired metal element and more oxidizable elements and a liquid metal phase containing the desired metal element and more oxidizable elements are caused to flow in paths extending between and inclusive of a metal purity control zone and a metal recovery control zone. The desired metal in high purity is obtained by maintaining a slag phase in the metal purity control zone that is rich in the oxide of the desired metal. Obtaining the desired metal in high yield is ensured by maintaining a metal phase in the metal recovery control zone that contains predetermined concentrations of the more oxidizable elements. In one embodiment, the desired metal element and a more oxidizable metal element, both contained in a metalliferous material are recovered in separate liquid metal streams from a single furnace. The removal of certain impurities, such as phosphorus in iron, may require treatment with a reactive flux.

CROSS-REFERENCE TO RELATED APPLICATION

This application is a continuation-in-part of copending U.S. application Ser. No. 22,766 in the names of Norman A. D. Parlee and William E. Mahin field on Mar. 26, 1970, now abandoned.

BACKGROUND OF THE INVENTION

This invention relates to the production of metals in high purity and high yield from metalliferous materials. More particularly, it relates to the separation and recovery in a pyrometallurgical process of a desired metal element or elements, each in high purity and yield, from metalliferous materials, such as ores, concentrates and alloys, containing the desired metal and other constituents which are difficult to separate pyrometallurgically from the desired elemental metal by conventional techniques.

Production of a high purity metal element from metalliferous materials, such as mixtures of iron with manganese, copper, or nickel or combinations thereof, typically include several batch operations. For example, recovery of elemental nickel from oxidic nickel ores of the lateritic or garnieritic types generally includes the steps of reduction in a furnace, as of the electric arc or blast type, to obtain a normally iron-rich nickel alloy and then subjecting the alloy to further pyrometallurgical, chemical or electrolytic treatment, or combinations of two or more of these, to recover the nickel constituent in relatively high purity. These further treatments commonly involve partial oxidation of the iron constituent in a batch type operation, followed by electrolytic refining or vapometallurgical refining. These operations not only result in relatively low nickel recovery but also require extensive refining facilities with correspondingly high capital and operating costs.

Also, copper sulfides in typical copper ores which are rich in iron are concentrated by mineralogical techniques, but separation of these copper sulfide concentrates, containing significant quantities of iron, requires a series of complex methods which necessitate extensive equipment and labor.

Furthermore, the recovery by pyrometallurgical methods of high purity elemental metals, of great utility in many varied applications, is often prohibitively expensive. For example, it is well known that high purity iron (e.g., 99.95% or more) has certain ductility, magnetic and corrosion resistive properties. However, such purity requires various expensive chemical and electrolytic methods according to the present methods.

In conventional production of high purity copper or nickel, the metals are formed into anodes by pyrometallurgical techniques for use in an expensive electrolytic step. Even using this technique, it is difficult to produce copper of 99.99% purity, a practical necessity for many electrical applications. Furthermore, 99.80% pure nickel, produced electrolytically, still contains on the order of 0.10% cobalt about the maximum amount acceptable for certain applications.

It is a general object of the invention to provide a single pyrometallurgical furnace system for the recovery of a desired metal element in high purity and yield which eliminates the need for the aforementioned combination of costly operations.

It is another object of the invention to provide a furnace system of the above type in which metals may be recovered at higher purity than herebefore accomplished in an economical process.

It is a further object of the invention to provide a continuous furnace system of the above type from which a desired metal element and a more oxidizable metal element may be withdrawn in separate metal streams of high purity and yield.

It is another object of the invention to provide a furnace system of the above type with relatively low capital and operating costs.

It is still another object of the invention to provide a method for predetermining and controlling the oxidizing and reducing conditions necessary at various points in the above furnace system to produce a desired metal product of a given purity and yield.

Other and further objects of the invention will be apparent from the following description taken in conjunction with the drawings appended thereto.

SUMMARY OF THE INVENTION

In accordance with the aforementioned objects, a furnace system has been provided for the separation and recovery of a desired metal element in high purity and high yield from metalliferous materials, defined herein as ore, concentrates, alloys and combinations thereof, which contain the desired metal element and a more oxidizable element or elements.

As used herein, a "desired metal elements" means that metal element which is present in the metalliferous material in significant quantity and which is least readily oxidizable compared to other elements present in significant quantity in metalliferous material.

As used herein, a "more oxidizable element" means a metallic or nonmetallic element, which is present in the metalliferous material in significant quantity and which is significantly more oxidizable than the desired metal element and which, in liquid form, functions as a reducing agent for the oxide of the desired metal element. Included in this definition are such elements as carbon and silicon. However, impurities, such as phosphorus or sulfur in iron or arsenic, antimony, and bismuth in copper, which are difficult to remove in the absence of a reactive flux, are included within the definition only if reactive fluxes are employed in the process. The highly oxidizable metals such as the alkaline earth metals (e.g. calcium and magnesium), the alkali metals (e.g., sodium and potassium), and aluminum are not included within the definition of more oxidizable metal.

In the present process, a liquid slag phase containing oxides of the desired metal element and a more oxidizable element or elements and a liquid metal phase containing the desired metal element and a more oxidizable element or elements are caused to flow in respective paths extending between, and including near their extremities, a metal purity control zone and a metal recovery control zone. Intimate contact and chemical reaction between the liquid slag phase and the liquid metal phase are promoted in the two aforesaid zones. High purity for the desired metal is obtained by controlling the concentration of the oxide of the desired metal in the liquid slag phase of the metal purity control zone at a predetermined and substantial ratio (e.g., a ratio of weight of the oxide of the desired metal element to the combined weights of the oxides of the more oxidizable elements of at least 1:3) while adding an agent containing available oxygen for oxidizing substantially all of the more oxidazable elements and a portion of the desired metal element in that zone. High yield for the desired metal element is achieved by controlling the concentrations of the more oxidizable elements in the liquid metal phase in the metal recovery control zone at predetermined significant levels, based upon at least three factors described hereinafter, while adding an agent that contains available reducing portential for reducing substantially all of the oxide of the desired metal element.

The liquid slag phase flows in a path from the metal purity control zone to the metal recovery control zone whereas the liquid metal phase flows in a path from the metal recovery control zone to the metal purity control zone. In certain embodiments of the invention, as described hereinafter, the flow paths of the slag and metal phases will be contiguous and in the same vessel or furnace, and the liquid slag and metal phases will be in intimate contact and in countercurrent relationship during their respective flows between the metal purity control zone and the metal recovery control zone, thereby permitting intimate interphase contact and intraphase mixing during their flows between the metal purity control zone and the metal recovery control zone. The metalliferous material may be introduced into either of the aforesaid liquid slag phase or liquid metal phase or both.

To recover a desired metal element product according to the invention which is low in concentration of certain undesirable difficult-to-remove impurities, such as phosphorus and arsenic, treatment with a reactive flux has been found to be desirable. In one such flux treatment, a basic flux such as calcium oxide or one containing calcium oxide and fluorspar is added in the metal purity control zone. To lower the levels of such impurities even further, the liquid metal from the metal purity control zone may be fed to an impurity separation zone to which a basic flux and an oxidizing agent are added to react with the impurity to form a slag phase for removal of the impurity and a metal phase low in content of such impurities.

In a further embodiment of the invention, a desired metal element and a more oxidizable metal element may be recovered from a metalliferous material containing the two metals in separate liquid metal streams from a single furnace system. This is accomplished by adding a more oxidizable metal yield zone to the aforementioned metal purity control zone and metal recovery control zone. Liquid slag rich in the oxide of the more oxidizable metal element is directed from the metal recovery control zone to the more oxidizable metal yield zone wherein a reducing agent is introduced to form a metal phase of the more oxidizable metal element in contact with the slag phase therein. The thus-formed more oxidizable element and the remaining slag impoverished in the oxide thereof are removed in separate streams from the yield zone. The slag forms a substantially continuous phase in a path from the metal recovery control zone to the more oxidizable metal yield zone while the metal phase from the former zone is sepaarted from the metal phase of the latter zone. In this manner, both metal elements may be recovered from a single vessel. In one flow construction, the slag phase and metal phase flow concurrently in the more oxidizable metal yield zone and the more oxidizable metal element is removed from a downstream portion thereof. Alternatively, the flow in the more oxidizable metal yield zone may be countercurrent with the more oxidizable metal element removed from an upstream portion of the zone near the separation from the metal recovery control zone. Separation of the metal phase of the metal recovery control zone and more oxidizable metal yield zone can be accomplished by a physical dam or by adjusting the flow rate of the metal flowing in the two zones so that a neutral flow zone separates the liquid metal in each zone.

BRIEF DESCRIPTION OF THE DRAWINGS

FIG. 9 is an elevation view, in section, of an elongated furnace system suitable for the removal in separate liquid streams of the desired metal element and a more oxidazable metal element.

DETAILED DESCRIPTION OF THE PREFERRED EMBODIMENTS

Figure 1:
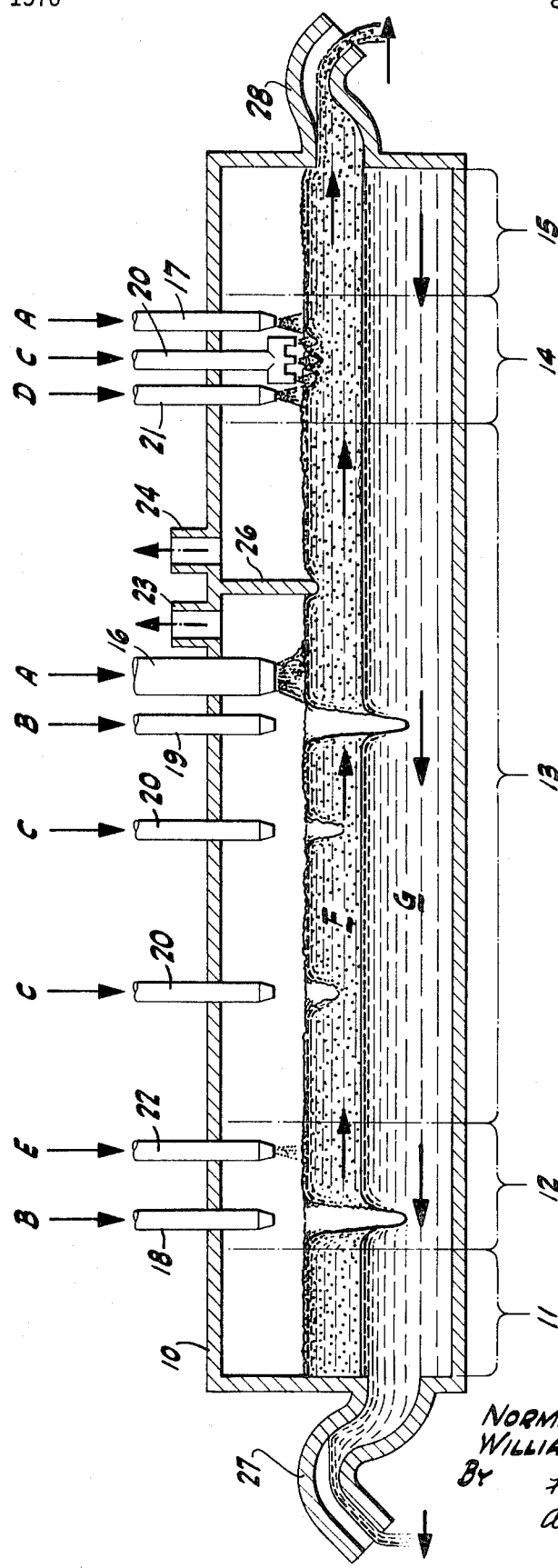
FIG. 1 is an elevation view, in section, of an elongated furrace system suitable for practicing the invention.

According to the invention, a metal of high purity and at high recovery is produced by establishing a metal purity control zone and metal recovery control zone communicating with each other via a liquid metal phase flow path and a countercurrent liquid slag phase flow path, with careful control of the chemical reactions.

The process of the present invention utilizes a furnace system in which a liquid slag phase containing oxides of both the desired metal and the more oxidizable element or elements flows in one general direction while liquid metal containing both the desired metal and the more oxidizable elements flows generally in the opposite direction. The desired metal of high purity is removed as liquid metal at a point at or near one end of the furnace system while liquid oxidic slag impoverished in the desired metal is removed at a point at or near the opposite end of the furnace system. The metal purity control zone is maintained in the vicinity of the liquid metal removal point and the metal recovery control zone is maintained in the vicinity of the liquid slag removal point.

The furnace system including the metal purity control zone and the metal recovery control zone may be a single elongated vessel wherein the metal purity control zone and the metal recovery control zone are at opposite portions of the vessel or it may be a series of two or more vessels interconnected by suitable passageways for containing the liquid metal and liquid slag in their flows from one vessel to the next vessel.

One important aspect of the invention is that high purity of the desired metal product is obtained by oxidizing the more oxidizable element or elements entering the metal purity control zone from the liquid metal phase into the liquid slag phase, to ensure that the more oxidizable elements are at a low level in the metal product, while maintaining a concentration of the oxide of the desired metal in the slag in that zone at a substantial level which is at least as high as that level which would be substantially in chemical equilibrium with the desired metal having the desired degree of purity. For example, the ratio of the weight of the oxide of the desired metal to the combined weight of the oxides of the more oxidizable elements is preferably at least 1:3. The exact amount of the oxide of the desired metal flowing from the metal purity control zone is dependent upon the amount of more oxidizable element or elements entering the metal purity control zone in the liquid metal phase. A generally unidirectional flow of liquid slag containing the oxides of both the desired metal and the more oxidizable element or elements is maintained through a flow path originating near the metal purity control zone and ending near the metal recovery control zone and which includes both of the said zones.

Another aspect of the invention is the control of conditions in the metal recovery control zone to ensure a high recovery of the desired metal to compensate for the aforementioned flow of oxide of the desired metal from the metal purity control zone. High recovery is accomplished by reducing the oxide of the desired metal entering the metal recovery control zone in the liquid slag phase back into the liquid metal phase, to ensure that the liquid slag leaving the furnace system is impoverished to a high degree in oxide of the desired metal, while maintaining in the liquid metal in that zone concentrations of the more oxidizable element or elements at least as high as those concentrations which would be in chemical equilibrium with a slag having the desired degree of impoverished with respect to the desired metal. A generally unidirectional flow of liquid metal containing both the desired metal and the more oxidizable element or elements is maintained through a flow path originating near the metal recovery control zone and ending near the metal purity control zone and which includes both of said zones.

The oxidation reaction in the metal purity control zone is controlled by adjusting the quantity introduced of an agent (hereinafter referred to as "the oxidizing agent") that contains available oxygen for oxidizing the more oxidizable elements and, in most (but not all) cases, a portion of the desired metal element. At least some of this oxidizing agent is added in the metal purity control zone, the amount being regulated so as to attain the required slag composition therein. Likewise, the reduction reaction in the metal recovery control zone is controlled by adjusting the quantity introduced of an agent (hereinafter referred to as "the reducing agent") that contains available reducing potential for reducing the oxide of the desired metal element and, in some cases, a portion of the more oxidizable element or elements. At least some of this reducing agent is added in the metal recovery control zone, the amount being regulated so as to attain the required metal composition therein.

The desired metal element of high purity is removed from the system either at the metal purity control zone or at a point near the metal purity control zone after this metal is more effectively separated from any entrained slag that might have been present. The slag impoverished in the oxide of the desired metal is removed from the system either at the metal recovery control zone or at a point near the metal recovery control zone after more effectively separating the slag from any entrained metal that might have been present.

Referring to FIG. 1, one furnace system suitable for carrying out the process of the invention includes an elongated vessel 10 which is functionally divided into a series of undivided zones generally designated as a metal separation zone 11, a metal purity control zone 12, an intermediate zone 13, a metal recovery control zone 14 and a slag separation zone 15. Feed tubes 16 and 17 are provided for the introduction of pre-melted metalliferous feed material A into zones 13 and 14, respectively. Lances 18 and 19 are provided for the introduction of an oxygen-containing gas B into zones 12 and 13, respectively. To promote good mixing between the metal and slag phases and to assure good contact of the reactants, pipes 20 extending into vessel 10 are provided for the introduction of inert or nonreactive gas C. As an alternative to pipes 20, an injection tube (not shown) may project directly into the liquid metal phase. Feed tube 21 is provided for the introduction of a reducing agent D, such as hydrogen or carbon into zone 14. A flux feed tube 22 is provided in the metal purity control zone section of vessel 10 for the introduction of flux E when necessary. In the vessel, a slag phase F is formed flowing from the metal purity control zone to the metal recovery control zone while a metal phase G is formed when necessary. In the vessel, a slag phase F is formed flowing from the metal purity control zone to the metal recovery control zone while a metal p hase G is formed simultaneously flowing in a countercurrent direction. An optical pyrometer (not shown) or other suitable means may be employed to monitor the temperature of the liquid slag phase. Exhaust openings 23 and 24 remove the hot exhaust gases formed in the vessel and a separation barrier 26 prevents the intermixing of the generally oxidative gases exiting through the former opening with the generally reductive gases exiting through the latter opening. Liquid metal phase G is removed from metal separation zone 11 by an appropriately positioned and shaped removal spout 27. The uppermost portion of the spout is at a low enough level to form a dam to hold back the lighter slag phase but to permit the lower metal phase to pass. In a contrasting manner, slag removal spout 28 is positioned at a level substantially above metal phase so as to permit only the lighter slag phase to be removed while retaining the metal phase in the vessel.

In one mode of operation of the furnace system of FIG. 1, a metalliferous material is divided into two portions and introduced into vessel 10, one portion into intermediate zone 13 and the other portion into metal recovery control zone 14 via feed tubes 16 and 17, respectively. A liquid metal and liquid slag phase are formed at the furnace temperature (about 1900° K.) with the former phase flowing from the metal recovery control zone to the metal purity control zone and the latter phase flowing countercurrently thereto and in intimtae contact therewith. Oxygen, or other oxidizing agent, is introduced into the metal purity control zone 12 through lance tube 18 under sufficient pressure to impinge upon the metal phase therein and oxidize the more oxidizable elements and a portion of the desired metal element into the slag phase. Oxygen is also introduced into intermediate zone 13 through lance tube 19 adjacent to the metalliferous feed when it is desired to separate a feed comprising a mixed metal feed, such as an alloy, since oxygen in this location assists the formation of a continuous slag phase in the intermediate zone and minimizes the recycling of the oxide of the desired metal. A reducing agent is introduced through tube 21 into the metal recovery control zone 14 to reduce the desired metal in oxide form in the slag into the metal phase. Slag impoverished in the desired metal element is removed from spout 28 after passing through slag separation zone 15 wherein generally quiescent conditions are maintained to form a distinct interface between the liquid metal and slag phases so that metal droplets are not entrained in the slag phase. The desired metal product similarly passes through a quiescent zone (metal separation zone 11) prior to removal from spout 27.

Various portions of the elongated furnace system shown in FIG. 1 may require supplementary heat either by electric arc or induction heating. The portions of the elongated furnace which are most likely to require this supplementary electric heating are those located in or near the metal recovery control zone where generally reducing conditions will cause the reactions to be endothermic.

Figure 2:
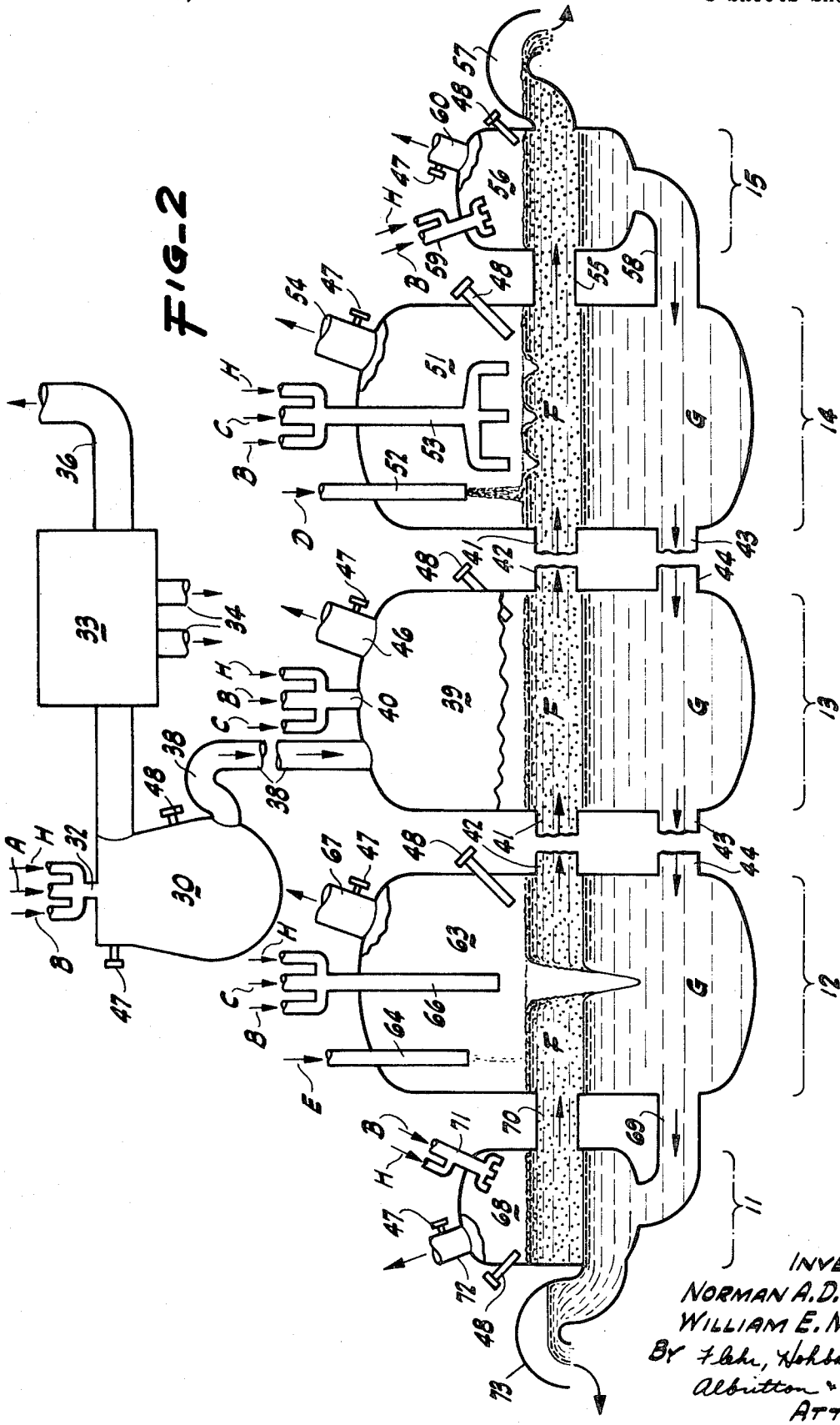
FIG. 2 is an elevation view, partly in section, of a suitable furnace system for practicing the invention.
Figure 3:
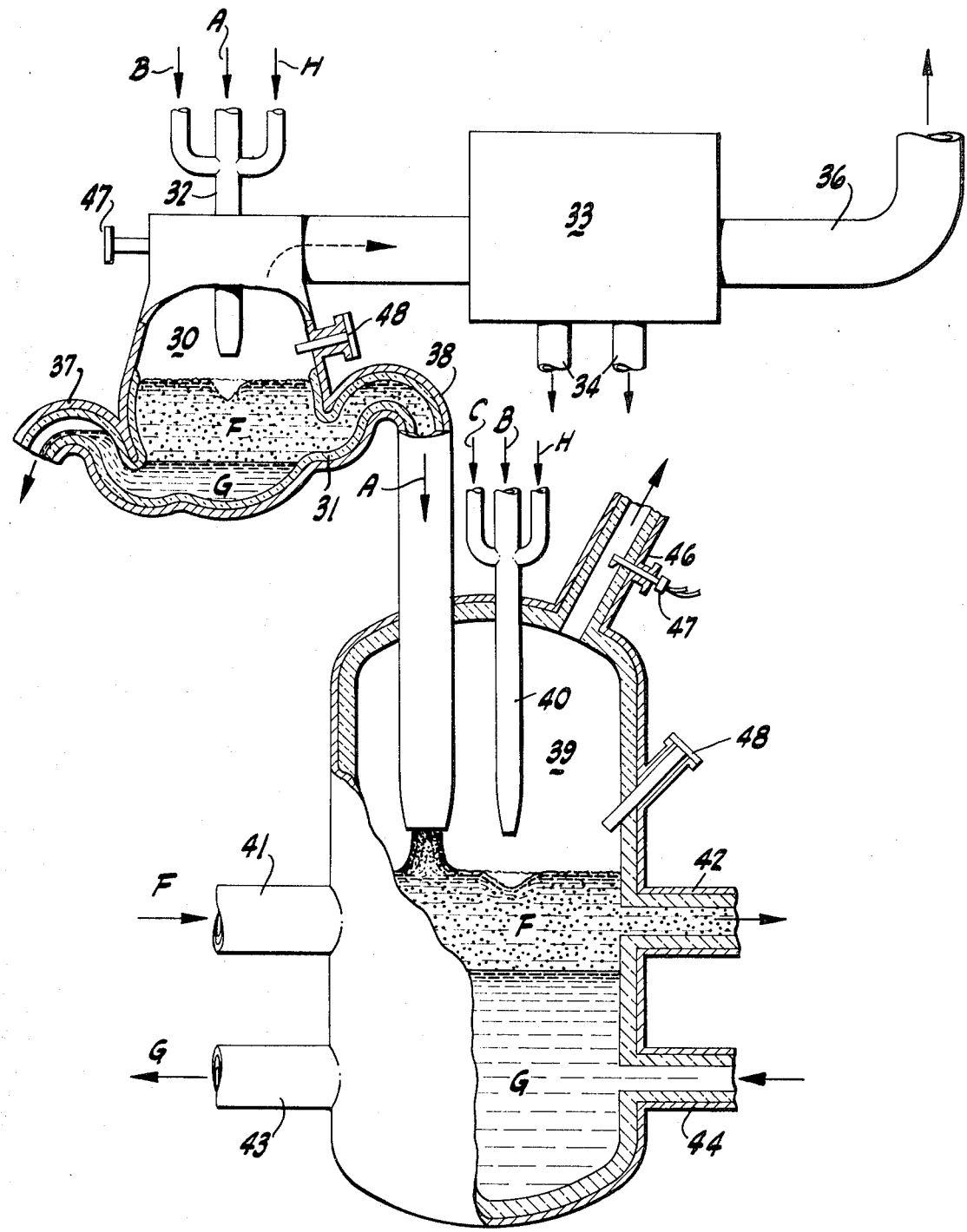
FIG. 3 is an elevation view, partly in section, of the vessel for melting the metalliferous feed and the vessel which receives the melted feed, both vessels being shown in greater detail than in FIG. 2.

Referring to FIGS. 2 and 3, another furnace system is shown in which separate vessels are employed for zones 11, 12, 13, 14 and 15, and in which the means for supplying the metalliferous feed material is set out in detail. In this system, the feed material is premelted in a melting vessel 30 having a protective skull 31 formed with water-cooled walls, as shown generally in FIG. 3, and including a three-branched feed tube 32 to which is fed an oxygen-containing gas B, feed material A, and a fuel gas H, such as natural gas, the two gases combining to form a combustion mixture for heating the vessel contents. Other heating means (not shown) such as an electric arc or induction heating may also be used, if necessary. Hot gases generated in vessel 30 may be ducted to a vapor and particulate material recovery system 33 from which these materials exit in tubes 34. The gas stream is cooled by suitable means (not shown) and exits through duct 36. Vessel 30 includes a metal outlet spout 37 (not shown in FIG. 2) and a slag outlet duct 38 for the removal of a metal phase separate from a predominant slag phase. Spout 37 is only used when there is partial reduction of the feed in vessel 30 prior to introduction into the furnace system through duct 38. The reducing atmosphere within melting vessel 30 may be controlled as by adjusting the ratio of the partial pressure of carbon dioxide to carbon monoxide ($p_{CO_2}/p_{CO}$) therein as will be explained hereinafter.

Vessel 39 which contains the intermediate zone 13 of the furnace system, is supplied with the slag from vessel 30 as a metalliferous feed material through duct 38. Liquid slag and metal phases form into two layers in intimate contact with each other in the vessel. An inlet tube 40 is provided for the introduction of an oxygen-containing gas B, a non-reactive gas C to provide adequate mixing between the slag and metal phases, and a fuel gas H to supply combustive heat to maintain the vessel contents in liquid form (1900° K.). Vessel 39 includes ducts 41 and 42, respectively, for the ingress and egress of liquid slag, ducts 44 and 43, respectively, for the ingress and egress of liquid metal, and outlet port 46 for the discharge of hot effluent gases. A protective skull (not shown) may be provided by water cooling the vessel walls. Sensing elements 47 in duct 46 provide a method for monitoring the temperature and composition of the effluent gases, which information may be used to control the feed ratio of gases B and H. The total flow of these gases is employed to regulate heat input into the vessel. Additional heat input if required may be supplied to the vessel by electric arc or induction heating. As one measurement of this input, the temperature of the liquid slag phase is monitored by a sensing element 48, suitably an optical pyrometer positioned within a sighting tube. Similar sensing elements for the same purpose are provided for each vessel in the furnace system and for the melting vessel. Other sensing elements might include gas probes (not shown) near the liquid phases or solid electrolytic cell probes for measuring the oxygen activity in a liquid phase.

The liquid slag phase formed in vessel 39 is directed through duct 42 into vessel 51 containing the metal recovery control zone 14 wherein, under generally reducing conditions, the desired metal of the slag phase is recovered into the liquid metal phase and flows through duct 44 into vessel 39. Vessel 51 includes an inlet port 52 for the introduction of reducing agent D, such as carbon, in sufficient quantity to reduce the required amount of the oxide of the more oxidizable element into the liquid metal phase and to reduce the remaining oxide of the desired metal to be recovered. In addition, a tube 53 is provided for the introduction of an oxygen-containing gas B, fuel gas H, and nonreactive gas C. The fuel gas and oxygen-containing gas are employed to maintain the temperature at a sufficient level within the vessel (1900° K.). If required, additional heat input may be supplied to the vessel contents by electric arc or induction heating. The nonreactive gas provides agitation for the two liquid phases for uniform dispersion of the carbon throughout the slag phase to promote reaction therewith and to maintain the desired reducing atmosphere in the effluent gases which are removed through outlet port 54. Sensing devices 48 and 47 of the aforementioned type may be provided to measure the temperature and the reducing nature of the effluent gases in outlet port 54 and in response to such analysis to control the amount of carbon or other reducing agent introduced through inlet port 52.

Separation vessel 56 contains slag separation zone 15 which is supplied with liquid slag from duct 55 and returns liquid metal in the opposite direction through duct 58. Relatively quiescent conditions are maintained in the vessel to permit any entrained droplets of reduced liquid metal which have not been completely settled out of the agitated slag phase in vessel 51 to do so. Vessel 56 includes a duct 55 for the introduction of slag from vessel 51, slag outlet spout 57, a liquid metal return duct 58, a burner 59 for introduction of oxygen-containing gas B, and fuel gas H, an outlet port 60 for removal of hot gases, and sensing elements 48 and 47 to determine temperature and gaseous composition. Burner 59, located at sufficient distance above the upper surface of the liquid slag layer to avoid liquid turbulence, provides some of the necessary heat and the desired atmosphere in vessel 56. An induction heater, designed to minimize the circulation (not shown) may be used to heat the liquid metal phase to maintain the desired 1900° K. temperature within the vessel. It is apparent that the upper level of the slag layer within vessel 56 is controlled by the height of the overflow point of slag removal spout 57.

Vessel 63 is provided at the other side of intermediate vessel 39 and contains metal purity control zone 12. The vessel is supplied with liquid metal through duct 43 and returns liquid slag in the opposite direction through duct 41. Vessel 63 includes feed tube 64 for introduction of flux E, lance 66 for the introduction of oxygen-containing gas B, a fuel gas H, and nonreactive gas C to promote agitation, and an outlet port 67 for effluent gases. The combination of fuel gas and oxygen serve to heat the vessel to the desired temperature (on the order of 1900° K.) and also to control the oxidizing conditions. Induction heating may be applied to provide added heat if necessary. A nonreactive gas may be added if necessary to provide sufficient velocity for the oxygen to penetrate the slag phase and to impinge directly upon or into the metal phase G for the desired degree of oxidation. Fluxing material E is provided, if necessary, to fluidize the slag phase. Vessel 63 further may be provided with sensing elements 47 and 48 which function as previously discussed.

Vessel 68, containing metal separation zone 11, is supplied with liquid metal from metal purity control zone 12 via metal removal duct 69 and liquid slag is returned through slag recirculation duct 70. Metal separation zone 11 is maintained at quiescent conditions, like slag separation zone 15, to allow for the separation of the metal from any slag which might have become entrained in the liquid metal phase which slag is recycled to vessel 63. Vessel 68 includes a burner 71, an outlet port 72 for effluent gases, a metal removal spout 73, and sensing elements 47 and 48. Burner 71 provides the desired atmosphere and supplies the heat necessary to maintain the vessel contents in liquid form (on the order of 1900° K.). Induction heating also may be used to apply supplementary heat. The upper level of the slag layer within vessel 68 is established by the level of the removal spout 73.

Referring to FIG. 2, intermediate vessel 39 is broken away from vessels 51 and 63 to illustrate that further intermediate vessels of the same type as vessel 39 may be interjected, if required, to accommodate more than the three depicted stages (the metal purity control zone, intermediate zone and metal recovery control zone). For example, if five stages are necessary for reasons to be explained hereinafter, one additional vessel could be positioned on each side of vessel 39. Such additional stages are employed as the desired metal becomes more difficult to separate from the more oxidizable element.

Figure 4:
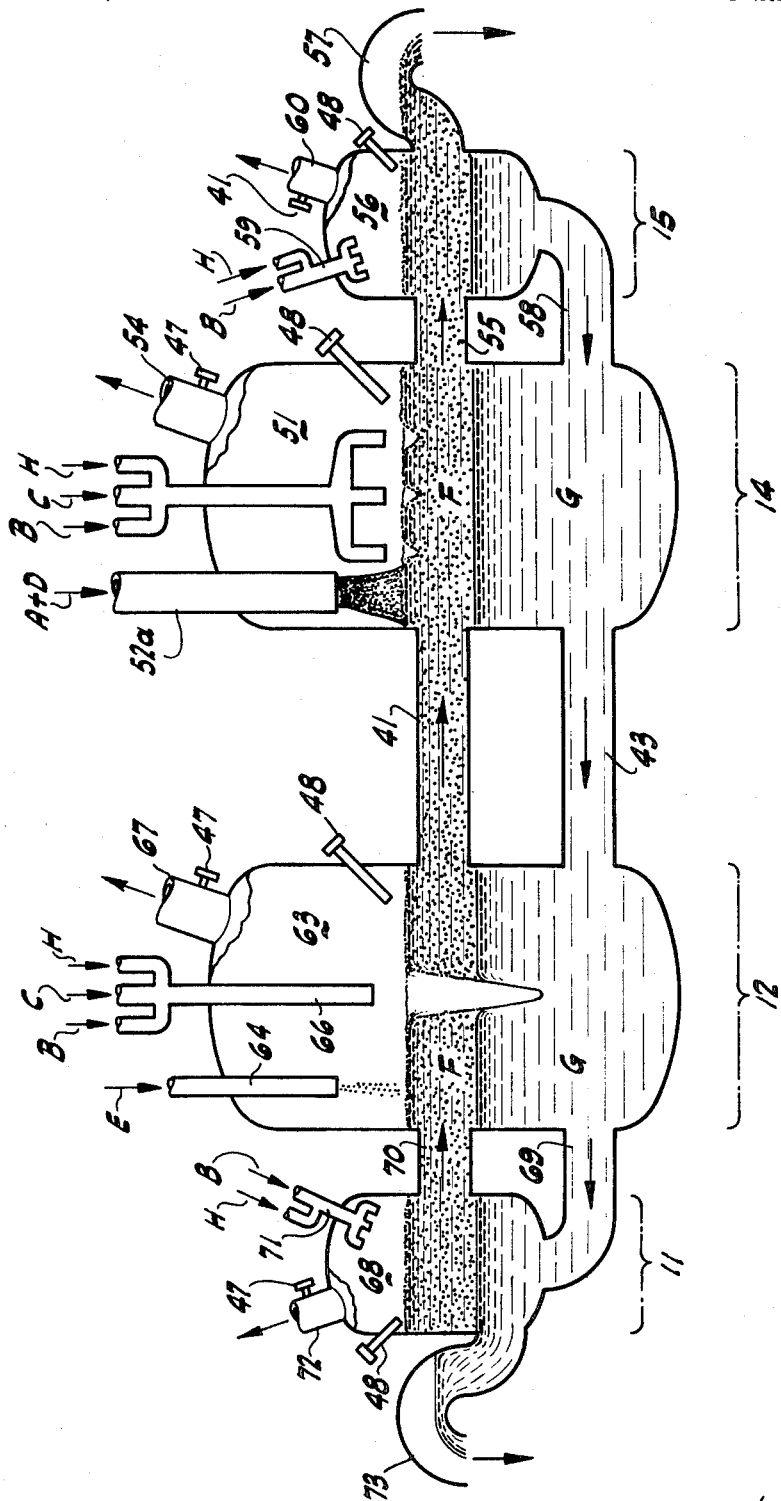
FIG. 4 is an elevation view, in section, of a further form of furnace system suitable for practicing the invention.

Referring to FIG. 4, a furnace system, similar to the one illustrated in FIGS. 2 and 3, is shown for a metalliferous feed material which requires only two stages and so the vessel for the intermediate zone is eliminated. Like parts are employed for like numbers for the metal separation zone 11, metal purity control zone 12, metal recovery control zone 14, and slag separation zone 15. The metalliferous material A along with reducing agent D is supplied to vessel 51 by means of inlet port 52a which is enlarged in comparison to inlet port 52 of FIG. 2 since the latter port serves to introduce only reducing agent.

Figure 5:
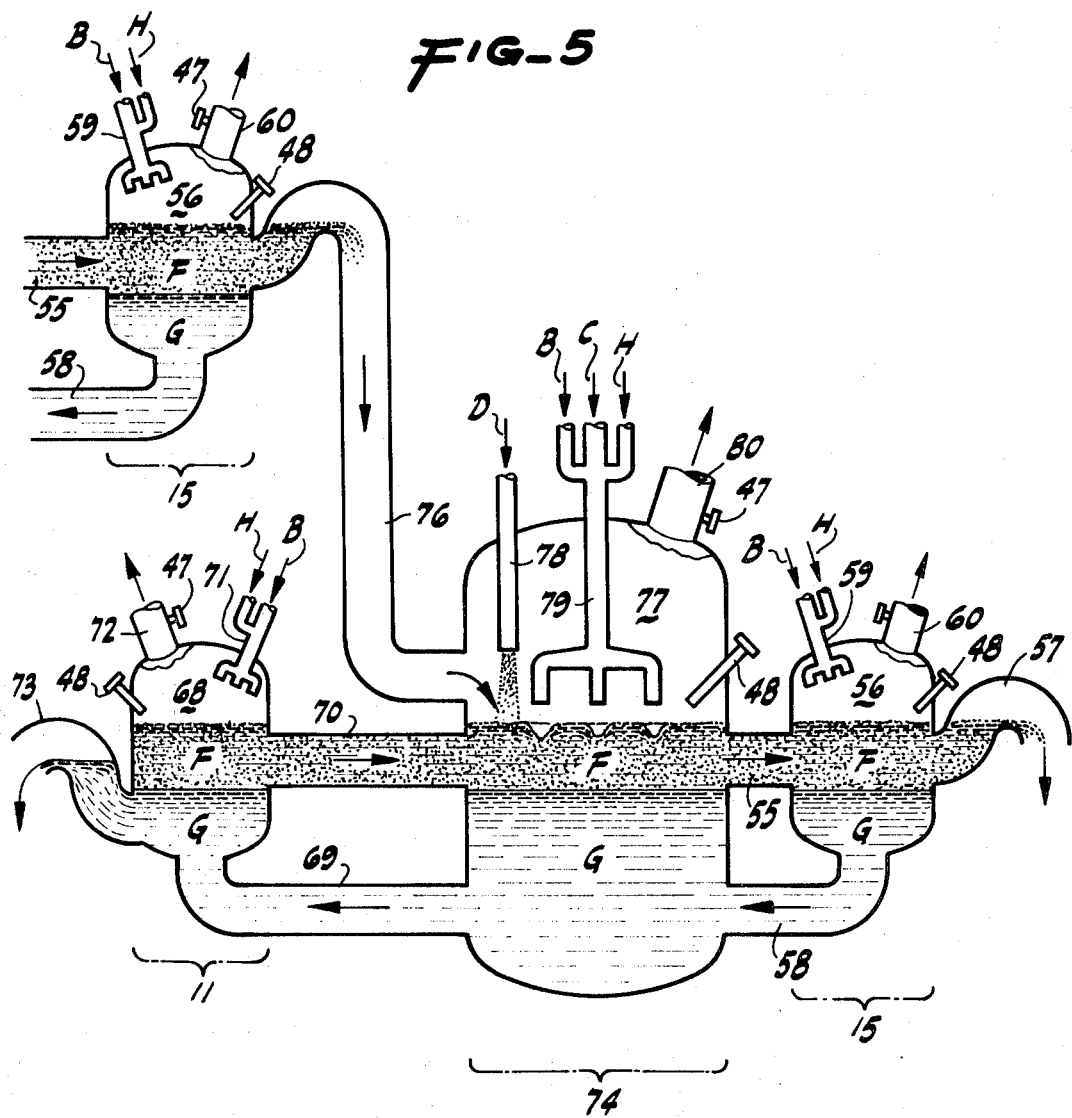
FIG. 5 is an elevation view, in section, illustrating a secondary furnace system for treating the slag from a furnace system, such as the system depicted in FIG. 2.

Referring to FIG. 5, a secondary furnace system, including a secondary metal recovery zone 74, is shown for the reduction and recovery in a metal phase of the more oxidizable metal element in the slag phase removed from the "primary" furnace system, such as shown in FIGS. 1 and 2 or in FIG. 4. Vessel 77, containing zone 74, is supplied with slag removed from slag separation zone 15 shown in FIGS. 2 or 4, by a duct 76. Vessel 77 includes a reducing agent feed tube 78, a burner 79 (for the introduction of an oxygen containing gas B, fuel gas H and inert gas C), an outlet port 80 for effluent gases and sensing elements 47 and 48. The gases introduced through burner 79 help maintain the desired temperature of 1900° K. within the vessel and promote mixing of the two liquid phases therein to thereby disperse the reducing agent (e.g., carbon) throughout the slag phase. This accelerates reduction of the slag by the carbon. This reaction may be controlled by adjusting the $p_{CO_2}/p_{CO}$ to levels explained hereinafter. Since the reduction process is endothermic, the requisite amount of heat may be supplied by means such as an electric arc or induction heating (not shown) of the liquid and metal phases.

Metal separation zone 11 and slag separation zone 15 of the type described in conjunction with FIG. 2 are provided to separate, respectively, slag droplets from the liquid metal and reduced metal droplets from the slag phase. Like parts of the separation zones of FIGS. 2 and 5 are denoted with like numbers. Thus, the secondary liquid metal phase passes through a metal removal duct 69 into vessel 68 which contains the metal separation zone from which the secondary metal product is removed at spout 73 and the slag therein is recycled to vessel 77 via slag recirculation duct 70. Similarly, the slag from vessel 77 flows through duct 55 into vessel 56 which contains slag separation zone 15 from which slag is removed through spout 57 and liquid metal is recycled via return duct 58 to vessel 77.

Referring to FIG. 9, a furnace system is shown which may be supplied with a metalliferous feed material, containing a desired metal element and a more oxidizable element of a metallic type for the separation and recovery of the elements in separate metal streams. In the furnace systems of FIG. 9, this separation and recovery is performed in a single vessel which incorporates a metal separation zone 11, a desired metal purity control zone 12, an intermediate zone 13, a desired metal recovery control zone 14, and slag separation zone 15 the apparatus and mode of operation of such zones being of a general type as described with respect to FIG. 1 with like parts of vessel 10 of FIG. 1 accorded like numbers in FIG. 9. The oxide of the more oxidizable metal element is reduced to the metal phase in a more oxidizable metal yield zone 82 and is recovered after flowing through a settling zone 83, maintained in a quiescent condition.

The furnace system of FIG. 9 is contained in elongated vessel 84 which includes a dam or partition 86 between slag separation zone 15 and more oxidizable metal yield zone 82 at a level slightly above the top of the metal phase to prevent flow thereof between zones but at a level substantially below the top of the slag phase so that the slag phase is permitted to flow past. Vessel 84 is further provided with feed tubes 87 for the introduction of a reducing agent, such as carbon or hydrogen, at different points in zone 82 with a burner 88 for the introduction of fuel gas, oxygen, and an inert gas for dispersing the reducing agent and for maintaining the more oxidizable metal yield zone 82 at the desired temperature (1900° K.), and an outlet port 85 for the removal of effluent gases. An inert gas may be introduced through burner 88 to agitate the contents in zone 82 to promote the reaction between the phases and disperse the reducing agent. As explained hereinafter, the $p_{CO_2}/p_{CO}$ ratio is substantially lower in zone 82 than in zone 14 and so, to separate the gases, a gas partition 89 is provided between the two zones extending into the upper portion of the slag phase. The slag and metal phases to the right of partition 86 in FIG. 9 flow concurrently in intimate contact through settling zone 83 to an upper slag removal spout 90 and lower metal removal spout 91, respectively, for simultaneous removal in separate streams.

In operation of the furnace system of FIG. 9 the process performed to the left of dam 86 is essentially that performed in the same portion of FIG. 1 and so the slag flowing over the dam is of the same type as removed in slag removal spout 28 of FIG. 1 (i.e, impoverished in the desired metal and rich in the oxide of the more oxidzable metal). The flow path and processing of the metal phase to the left of dam 86 is identical to that of FIG. 1. The slag flowing into zone 82 is reduced by maintaining the $p_{CO_2}/p_{CO}$ ratio substantially below the value for equilibrium between the more oxidizable metal element and its oxide as shown in table I for common metal/metal oxide systems at 1900° K. However, the $p_{CO_2}/p_{CO}$ ratio should not be lowered to a greater extent than necessary for a reasonable recovery since the lower the value, the more impurities will be reduced into the metal phase to lower the purity of the metal product. As the slag flows toward spout 90, the quantity of the more oxidizable metal flowing in the metal phase is increased with a corresponding impoverishment of the slag phase. After completion of the desired degree of reduction, the metal and slag phases pass through separation zone 83, wherein quiescent conditions are maintained to provide a distinct separation of the phases. Then the slag phase, impoverished in the oxide of the more oxidizable metal element, is removed from upper spout 90 while the metal phase, of high purity and yield, is removed from lower spout 91.

The furnace system of FIG. 9 may be modified by eliminating dam 86 after establishing the aforementioned flow-paths and by establishing a zone in which there is essentially no net metal flow in either direction in the vicinity of the dam location of FIG. 9 to form a substitute "fluid dam." This fluid dam must be carefully controlled so that it does not shift to the right or left with a corresponding alteration of the desired reaction conditions in the bordering zones. One technique for holding the fluid dam in a fixed position is by placing a flow direction detector in the desired zone which transmits the information to a means for adjusting the conditions, if necessary.

A desired metal element and a more oxidizable metal element may be recovered in separate pure metal streams in another elongated furnace system, similar to that illustrated in FIG. 9 with either a physical or fluid dam and with a somewhat different method of operation. The major modification is that the more oxidizable metal element is withdrawn from the vessel through a spout in the vicinity of and just to the right of the dam. Therefore, the metal phase and slag phase flow countercurrently in the more oxidizable metal yield zone 82 and separation zone 83. The purity and yield of the more oxidizable metal produced may be closely controlled in the portion of the furnace to the right of the dam in a manner similar to the control of the purity and yield of the desired metal produced to the left of the dam. Namely, the $p_{CO_2}/p_{CO}$ ratio is low in a reducing atmosphere in the right hand portions of zones 82 and 83 and gradually increases to a higher ratio or oxidizing atmosphere near the more oxidizable metal removal spout located just to the right of and near the dam.

It is apparent that the aforediscussed system of separating and recovering two metals may be extended to recover three or more metals using two or more different metal removal points and one or more physical or fluid dams to the right of the primary dam in the furnace system shown in FIG. 9 for either countercurrent or concurrent flow of the metal and slag phases by carefully adjusting the oxidation-reduction conditions. For example, with countercurrent system in all portions of an elongated vessel containing two dams with a feed containing Ni, Fe, and Co, nickel is the desired metal element removed furthest to the left, iron is recovered furthest to the right and a Ni-Co-Fe alloy is recovered therebetween.

The metalliferous feed materials of the present invention include ores, concentrates, alloys and combinations thereof which contain a desired metal element and a more oxidizable element. Typical examples of ores which can be subjected to the process with good results include oxidic and siliceous nickel-bearing ores, such as laterites and garnierites; oxidic copper ores, such as cuprite; oxidic iron-bearing ores, such as hematite, limonite, iron-manganese and iron chromium containing ores, and sulfidic ores, such as copper and nickel sulfidic ores, which are oxidized to remove sulfur and to convert them to oxides. Concentrates suitable for the process includes the beneficiated ores recited above, or for example, metalluirigical slags resulting from the refining of iron and containing a desired metal in the form of oxide. Alloys from which at least one metal is to be separated and recovered include iron-nickel alloys, iron-chromium alloys, ferromanganese, nickel-chromium alloys, combinations of iron with copper, scrap iron, and alloys of copper and nickel.

The purities and compositions expressed herein for the feed materials and products are based upon values in the absence of any foreign elements or impurities not specifically expressed in percentages. For example, the percentages of Table III are expressed in the absence of flux, gangue or any other element not specifically recited in the table. This is also true with respect to the examples herein and ratios of the disclosure.

In general, the aforementioned $p_{CO_2}/p_{CO}$ ratios to be maintained in various portions of the furnace system are related to a reducibility series which is calculated from free energy values which reflect relative oxide stability. These values are employed as a measure of the oxidation-reduction conditions desired in the liquid metal and slag phases which control the purity and yield of the final product. Table I, shows equilibrium values of oxygen activity, commonly denoted in physical chemistry as the symbol $a_{O_2}$, for metal-metal oxide coexistence at 1900° K. The oxygen activity is in turn related to the ratios $p_{H_2O}/p_{H_2}$ and $p_{CO_2}/p_{CO}$. The latter two expressions represent the ratio of partial pressures of the gases which could be in equilibrium with the metal-metal oxide composition if carbon or hydrogen are present in adequate amounts.

TABLE I

Equilibrium values for metal-metal oxide coexistence at 1,900° K.

| Systems | $p_{O_2}(atm.)=a_{O_2}$ | $\dfrac{p_{H_2O}}{p_{H_2}}$-ratio | $\dfrac{p_{CO_2}}{p_{CO}}$-ratio | Reducibility factor "RF" |
|---|---|---|---|---|
| Ag-Ag₂O | 1.9×10⁺⁵ | 2.5×10⁺⁶ | 760,000 | 4,318,000 |
| Cu-Cu₂O | 1.8×10⁻² | 7.6×10⁺² | 2.5 | 1,3·5 |
| Pb-PbO | 1.8×10⁻² | 7.5×10⁺² | 2.0 | 1,·07 |
| Sb-Sb₂O₃ | | | 21 | 119 |
| Ni-NiO | 1×10⁻⁴ | 5.8×10⁺¹ | 17.8 | 101 |
| Zn-ZnO | | | ¹10 | 57 |
| Sn-SnO | | | 6.2 | 35 |
| Co-CoO | 4.2×10⁻⁶ | 1.15×10⁺¹ | 3.55 | 20 |
| Fe-FeO | 1×10⁻⁸ | 5.7×10⁻¹ | 0.176 | 1 |
| Cr-Cr₂O₃ | | | 0.002 | 0.0113 |
| Mn-MnO | 9.9×10⁻¹⁴ | 1.8×10⁻³ | 0.00057 | 0.0032 |
| Si-SiO₂ | 1.75×10⁻¹⁵ | 2.3×10⁻⁴ | 0.00007 | 0.0004 |

¹ Zn at 1 atm.

As used herein the term $a_{O_2}$ refers to the activity of oxygen in a system containing one or more metal oxides, or metals containing oxygen in solution, or both which are in equilibrium with the gas atmosphere present. $a_{O_2}$ is conventionally defined as $a_{O_2}=p_{O_2}/p_{O_2}°$ where $p_{O_2}$ is the partial pressure of oxygen in the system and $p_{O_2}°$ is the partial pressure of $O_2$ in a standard state. The standard state $p_{O_2}°$ is conventionally taken as one atmosphere and as used herein $a_{O_2}=p_{O_2}/1=p_{O_2}$. It can be shown that the equilibrium $p_{O_2}$ and the equilibrium $p_{CO_2}/p_{CO}$, and $p_{H_2O}/p_{H_2}$ ratios for metal-metal oxide coexistence are mathematically related to one another and thus they are all convenient and useful ways to express reducibility of a metal oxide.

As used in Table I, the values for $a_{O_2}$ and $p_{CO_2}/p_{CO}$ and $p_{H_2O}/p_{H_2}$ are for equilibrium at 1900° K. between some pure metals and their oxides and any of these offer a useful tool in comparing reducibility of these oxides with each other. That is, $Ag_2O$ for example is easier to reduce than $Cu_2O$ which in turn is easier to reduce than $NiO$, etc. When there is a difference in reducibility of two metal oxides it follows that the liquid metal of the more difficultly reducible of the two metal oxides (lower $a_{O_2}$) has reducing potential for the oxide of the other metal. Conversely, the more reducible oxide (higher $a_{O_2}$) can be used as an oxidizing agent for the less reducible (that is, the more oxidizable). For convenience, a reducibility factor hereinafter called "RF" is computed by dividing the $p_{CO_2}/p_{CO}$ or $(p_{O_2})^{1/2}$ or $p_{H_2O}/p_{H_2}$ of the system by the corresponding value for the Fe-FeO system. In this computation "RF" for Fe-FeO arbitrarily becomes 1. By definition the values for "RF" in Table I were determined as follows:

$$RF = \dfrac{(p_{CO_2}/p_{CO})\ \text{system}}{(p_{CO_2}/p_{CO})\ \text{Fe-FeO system}}$$

$$= \left(\dfrac{(p_{O_2})\ \text{system}}{(p_{O_2})\ \text{Fe-FeO system}}\right)^{1/2}$$

$$= \dfrac{(p_{H_2O}/p_{H_2})\ \text{system}}{(p_{H_2O}/p_{H_2})\ \text{Fe-FeO system}}$$

By use of the words "pure metal" herein is meant a metal that is pure with respect to elements other than dissolved oxygen. While the desired product metal obtained from the present invention may contain a significant amount of dissolved oxygen, this dissolved oxygen can be removed from the desired metal, prior to solidification, by a conventional de-oxidation process or by one of the recently developed gaseous de-oxidation processes.

The use of partial pressures of various gases as measures of reducibility of metal oxides does not necessarily mean that reactions involving the gas phase are always required in order to bring metals and oxides in the system into equilibrium with each other. The ultimate reactions involved actually are interchanges of atoms and electrons between the materials. The direction of such interchange may be predicted from free energy values. If oxygen is added for oxidation or carbon or hydrogen for reduction, reactions involving the gas phase are necessarily carried out. But the products of such reactions can further interact with each other to assist in the furtherance of equilibrium conditions.

In classifying the metallic elements the stability of compounds other than oxides and the equilibrium relationships among these compounds and the metals derived from them could be considered, as for example sulfides or chlorides. The rating of dissociation pressures for the same elements in various compound classes will not always be in the same order.

Since the actual reactions of the present process involve the exchange of oxygen atoms between the elements, it is feasible to use $a_{O_2}$ or $p_{CO_2}/p_{CO}$ or RF values for a direct measure of reducibility of the various oxides. In the discussion that follows, RF has been chosen as a suitable measure of reducibility.

In Table I the larger the RF for the oxide the easier this is to reduce. Where reducibility factors for two oxides are nearly the same number, the oxides generally have been found to be especially difficult to separate into nearly pure fractions by prior methods. Nickel and cobalt, for which the reducibility factors are fairly close, have been quite difficult to separate using prior methods. Where the reducibility factor for two oxides is quite different, as for iron and silicon, the difficulty of separating the two metals is not great.

Since the desired metal element is the least readily oxidizable element in the metalliferous feed material, it has the highest reducibility factor, "RF."

In the present invention a convenient means of comparing reducibility factors of some of the metal-metal oxide systems is to use the term Reducibility Ratio called "RR." This is the ratio between Reducibility Factors of two metal oxides AO and BO where $$RR = \frac{RF \text{ of metal oxide AO}}{RF \text{ of metal oxide BO}}$$

in a system involving metals and metal oxides A, B, AO and BO. It is to be understood that in the preceding expression, AO is always the oxide having the higher reducibility factor RF than the RF for the metal oxide BO, i.e. A is the desired metal.

For example, where

RF for Ni-NiO=101, and
RF for Fe-FeO=1
RR=101

Reducibility ratios for several metal oxide, metal systems are shown in Table II. The method of utilizing Reducibility Ratios is to make use of a relationship for equilibrium between a metal phase A, B, and a slag phase AO, BO, as follows:

$$\frac{\text{percent A}}{\text{percent B}} = RR \times \frac{\text{percent AO}}{\text{percent BO}}$$

The above simplified method of determining a relationship between metal and slag compositions is only applicable without adjustment where mol and weight fractions are nearly the same, where the metals and metal oxides form nearly ideal solutions and where both metals form monoxides. The method is sufficiently accurate for combinations of Ni, Co, Fe and Mn with their oxides NiO, CoO, FeO and MnO among themselves.

Where weight and mol percent are significantly different from each other mol percent or mol fraction must be used as the basis for calculations. Where metals do not form nearly ideal solutions or where oxides do not form nearly ideal solutions, activities must be used and indeed calculations frequently must be made from experimental data for the various compositions of metals or slags. Examples are the systems Fe-Si-C with FeO-SiO$_2$ and Cu-Fe with Cu$_2$O-FeO. For metal-metal oxide systems in which the two oxides do not have the same stoichiometric form, a different formula must be used, such as the following:

$$\frac{N_{Fe}}{(N_{Cr})^{2/3}} = RR \frac{a_{FeO}}{(a_{Cr_2O_3})^{1/3}}$$

where "N" is the mol fraction and "a" is the activity of the particular species.

TABLE II

Reducibility ratios for various metal oxide, metal systems at 1,900° K.

| Metal oxide, metal systems | Reducibility ratio "RR" |
|---|---|
| NiO-FeO-Ni-Fe | * 101 |
| NiO-CoO-Ni-Co | 5 |
| CoO-FeO-Co-Fe | 20 |
| FeO-MnO-Fe-Mn | 310 |

* 108 at 2,100° K.

As mentioned hereinbefore, the number of vessels and length of each vessel in the furnace system is determined by the number of required operating stages to obtain the desired degree of purity and yield for a particular metalliferous material. As discussed hereinafter, the number of operating stages also depends upon the "reflux ratio." An operating stage is contained in a separate reaction chamber or an integral part of an elongated vessel, which is interconnected with other operating stages in the process.

A "theoretical stage" is defined as one in which chemical equilibrium is reached. The number of theoretical stages may be calculated as described herein after a predetermination of the desired degree of separation. Since chemical equilibrium is never completely reached but only approached in any actual operating stage, the total number of operating stages which should be provided to obtain efficient operation will always exceed the number of "theoretical stages" which would be required for the same end result. However, an operating stage can be considered as "equivalent" to a fraction of a "theoretical stage."

In general, liquid metal enters each operating stage in the intermediate zone from the adjacent operating stage nearer the slag removal point in the liquid metal flow path and liquid slag enters each operating stage in the intermediate zone from the adjacent operating stage nearer the metal removal point in its flow path. The metal purity control zone may be considered as constituting one operating stage and the metal recovery control zone another operating stage so that the process requires a minimum of two operating stages.

An external agent and/or a metalliferous feed material may also be introduced into any particular operating stage. The external agent may be oxidizing with respect to the liquid desired metal and more oxidizable metal or metals, or it may be reducing with respect to all metal oxides, or it may be oxidizing with respect to one or more metals and reducing with respect to one or more metal oxides. The liquid oxidic slag, liquid metal, external agent and metalliferous feed material entering an operating stage will tend to approach a condition in which the liquid oxidic slag leaving the stage is in chemical equilibrium with the liquid metal leaving the stage.

In the embodiment of the process in which the operating stages consist of integral portions of one elongated vessel or chamber, there is a continuous, rather than a stepwise, change of composition of the liquid slag and liquid metal phases and it is possible to consider a portion of the continuous elongated chamber as constituting an "equivalent theoretical stage."

The flow of slag and metal in their respective flow paths is generally unidirectional and in directions opposite to each other. However, within any given operating stage there may be areas in which the relative flows of slag and metal are not always in an opposite direction since in certain embodiments of the process it is preferably to maintain relatively turbulent conditions to promote interphase contact and intraphase mixing. Maintenance of relatively turbulent conditions may also be preferred to promote the kinetics of the reactions between an externally introduced agent or feed material and the liquid slag or liquid metal phases, or both.

For the case where all of the oxidic slag originates in the metal purity control zone as a result of having introduced all of the agent containing available oxygen into that zone, there is a ratio of slag flow to product metal flow from that zone which constitutes a lower limit called a "minimum reflux ratio." For a metalliferous feed containing only two metallic elements (hereafter called a binary feed) this minimum reflux is a function of the type (oxide or metal) as well as the reducibility ratio for the metallic elements present in the metalliferous feed and the desired purity of the liquid product metal removed. (Note: For a feed containing more than two metallic elements there may be more than one minimum reflux ratio.)

The minimum number of theoretical stages is a function of the compositions of the product metal and the slag removed, and of the reducibility ratios for the metal/oxide system involved. In general, the minimum number of theoretical stages increases as the purity level of the desired product metal increases and as the yield of the desired metal contained in the feed increases. The minimum number of theoretical stages is greater as the reducibility ratios between the desired metal element and the more oxidizable element or elements become smaller (i.e. as the desired metal element becomes more difficult to separate from the more oxidizable elements).

As the quantities of liquid slag and liquid metal refluxed from the metal purity control zone and the metal recovery control zone, respectively, decrease, the number of theoretical stages, and hence the capital costs, increases. However, the unit cost of the desired products metal attributable to operating costs will decrease because of the greater throughput of the desired metal as the reflux ratios from the opposite portions of the furnace system are decreased. In general, the reflux ratios and the number of operating stages will be selected based on an economic optimization.

If the reflux ratios from the metal purity control zone and metal recovery control zone respectively are fixed, the distributed introduction of some of the external oxidizing or reducing agents in the intermediate zone will decrease the number of theoretical stages required. If the number of theoretical stages is fixed, and some of an external agent is distributed in the intermediate zone to oxidize some of the more oxidizable elements from the liquid metal phase before the liquid metal enters the metal purity control zone, the quantity of slag refluxed from the metal purity control zone can be decreased. Similarly, if an agent capable of reducing the desired metal oxide from the liquid slag phase into the metal phase is distributed in the intermediate zone, the reflux of the liquid metal from the metal recovery control zone can be decreased.

Exemplary of the external agents which may be introduced into the process for the purpose of oxidizing metals or reducing metal oxides are the following types of materials:

(1) Agents oxidizing to all elements present. Examples: gaseous oxygen and, for many metals, carbon dioxide and steam.

(2) Agents reducing to all metal oxides present. Examples: carbon, hydrogen and hydrocarbons.

(3) Agents oxidizing to some of the elements present while being reducing to some of the oxides present. Examples: mixtures of $CO_2$ and $CO$, and $H_2O$ and $H_2$.

(4) Agents oxidizing to the more oxidizable elements present but not to the desired metal. Example: NiO in Fe, Ni system.

(5) Agents reducing to the oxide of the desired metal but not to the oxides of all of the more oxidizable metals present. Example: Fe in FeO, NiO system.

The externally introduced oxidizing agents and reducing agents may be solids, liquids or gases.

The achievement of a high purity of the desired metal in the product metal is obtained by controlling the concentration of the oxide of the desired metal in the liquid slag which is in intimate contact with the product metal in the metal purity control zone. Table III presents data for a number of systems of commercial importance and shows the relation between the purity of the desired metal element in the product metal leaving the furnace and the "control level" of the oxide of the desired metal element in the liquid slag phase. The "control level" is a concentration of the oxide of the desired metal in the slag which is determined from the equilibrium relation for the particular slag/metal system. The concentration of the oxide of the desired metal must equal or exceed the "control level." From Table III it can be seen that for the metal-metal oxide systems of commercial importance, the control level for the concentration of the desired metal oxide, which must be equaled or exceeded in order to produce the desired product metal at purities greater than those attainable by prior art pyrometallurgical processing techniques, is at least 25 parts by weight of the desired metal oxide per 75 parts by weight of the combined weights of the more oxidizable element oxides or at a ratio of at least one to three. This ratio, as stated generally above, excludes oxides of more oxidizable elements introduced as a fluidity assisting agent such as a silica flux.

The 1900° K. operating temperature level on which Table III is based was selected as representative. For some systems, such as copper-iron, changing the operating temperature by several hundred degrees K. could have a significant effect on the equilibrium, whereas for other systems, such as nickel-iron, the effect would be relatively minor.

To obtain high recovery of the desired metal from the metalliferous feed material charged to the furnace, it is necessary to reduce substantially all of the oxide of the desired metal from the slag phase into the metal phase. This is accomplished by maintaining in the liquid metal in the metal recovery control zone concentrations of the more oxidizable element or elements at least as high as those concentrations which would be in equilibrium with a slag highly impoverished in the oxide of the desired metal. The concentrations of the more oxidizable elements in the metal phase which must be maintained in the metal recovery control zone in order to obtain the desired recovery of the desired metal, are proportional to the concentrations of the more oxidizable elements in the metalliferous feed material and inversely proportional to the fraction of the desired metal charged to the furnace which it is permissible to lose in the slag removed from the process. The concentrations of the more oxidizable metal elements in the liquid metal in the metal recovery control zone are also inversely proportional to the reducibility ratio for the particular metal systems involved. The term "reducibility ratio" is defined above.

Table III shows typical values for concentrations of the more oxidizable elements in the metal phase to be found in the metal recovery control zone for high degrees of recovery of the desired metal. In most instances the concentration of the more oxidizable metal elements in the metal phase represents a significant amount even in systems for which there is a large reducibility ratio, such as the copper-iron system (reducibility ratio is approximately 1100 for the oxide removal end of the furnace system) and in systems such as iron-manganese where the reducibility ratio is somewhat less (310) and where typical ores have a low concentration of the more oxidizable metal. However, in the iron-silicon-carbon system where the iron-silicon reducibility ratio is very high, the concentration of silicon (and carbon) is relatively quite low.

The expressions "an agent that contains available oxygen for oxidizing the more oxidizable elements" (herein also "oxidizing agent") and "an agent that contains available reducing potential for reducing the oxide of the desired metal element" (herein also "reducing agent") are used in the description of this new process in order to include the possibility that some metalliferous feed materials may be capable of oxidizing the more oxidizable elements, and that other metalliferous feed materials may be capable of reducing the oxide of the desired metal element. For example, in producing high purity iron, oxides of iron could be both a metalliferous feed material and the agent containing available oxygen for oxidizing the more oxidizable impurities such as silicon, manganese or chromium, to be used in providing and controlling the substantial level of the oxide of the desired metal (that is FeO) in the slag in the metal purity control zone. Similarly, in producing high purity nickel, iron-nickel alloy could be both a metalliferous feed material and the iron content therein could be an agent with potential for reducing nickel oxide to be used in controlling the concentration of the more oxidizable element (that is Fe) in the metal recovery control zone.

the desired metal oxide present in the oxidic metalliferous material will not act as an oxidizing agent for the desired metal in the liquid metal phase. In this case, the oxidizing agent is of the exemplary type denoted as (4) in the aforementioned list of external agents. However, if metalliferous oxide feed rich in the oxide of the desired metal is used as the externally introduced agent, the requirement that the slag composition in the metal purity control zone carry a substantial proportion of the oxide of the desired metal may be satisfied by the abundance of the desired metal oxide present in the metalliferous oxidic feed material itself, some of which would be added in the metal purity control zone.

With either type of oxidizing agent, i.e., either oxygen or metalliferous oxide rich in the desired metal oxide, at least some oxidic slag will originate in the metal purity control zone and flow from that zone toward the metal recovery control zone.

However, as previously stated, it is also possible to add some of the agents containing available oxygen for

TABLE III

Critical control levels for various systems and feed materials at 1,900° K.[1]

| | Metal purity control zone | | | Metal recovery control zone | | | |
|---|---|---|---|---|---|---|---|
| System | Purity of desired metal (wt. percent) | Oxide of desired metal in slag phase (wt. percent) [5] | System | Feed material (wt.) [2] | Recovery of desired metal (percent) [3] | Desired metal | More oxidizable element(s) in liquid metal phase (wt. percent) |
| Fe-Si-C | 99.999 Fe | 80 FeO (20 SiO$_2$) | Fe-Si-C | Fe-Si-C | | | |
| | 99.997 Fe | 52 FeO (48 SiO$_2$) | | | 99.9 Fe | | 0.10 Si 0.10 C |
| | 99.994 Fe | 25 FeO (75 SiO$_2$) | | 99/0.5/0.5 | | | |
| Cu-Fe | 99.999 Cu | 95 Cu$_2$O (5 FeO) | Cu-Fe | Cu-Fe | | | |
| | 99.990 Cu | 65 Cu$_2$O (35 FeO) | | 1/1 | 99.0 | Cu | 1.8 Fe |
| | 99.945 Cu | 25 Cu$_2$O (75 FeO) | | 1/100 | 99.0 | Cu | 97.0 Fe |
| Ni-Fe | 99.95 Ni | 95 NiO (5 FeO) | Ni-Fe | Ni-Fe | | | |
| | 99.80 Ni | 83.1 NiO (16.9 FeO) | | 5/95 | 99.0 | Ni | 95.0 Fe |
| | 97.10 Ni | 25 NiO (75 FeO) | | 5/95 | 99.8 | Ni | 98.9 Fe |
| Ni-Co-Fe | 99.80 Ni (0.10 Co 0.10 Fe) | 90.48 NiO (0.45 CoO 9.07 FeO) | | 25/75 | 99.0 | Ni | 75.0 Fe |
| | 96.90 Ni (0.20 Co 2.90 Fe) | 25.0 NiO (0.26 CoO 74.74 FeO) | | 95/5 | 99.0 | Ni | 5.0 Fe |
| Fe-Mn | 99.99 Fe | 97.0 FeO (3 MnO) | Ni-Co-Fe | Ni-C-Fe | | | |
| | 99.98 Fe | 94.2 FeO (5.8 MnO) | | 2.5/0.25/ | [4] 92.0 | Ni | 78.5 Fe 4.5 Co |
| | 99.5 Fe | 39.0 FeO (61 MnO) | | 97.25 | 99.6 | Ni | 94.3 Fe 4.7 Co |
| | 99.0 Fe | 25.0 FeO (75 MnO) | Fe-Mn | Fe-Mn | | | |
| Fe-Cr | 99.90 Fe | 75.0 FeO (25 Cr$_2$O$_3$) | | 70/1 | 99.0 | Fe | 0.46 Mn |
| | 99.15 Fe | 25.0 FeO (75 Cr$_2$O$_3$) | | 33/3 | 99.0 | Fe | 2.9 Mn |
| | | | | 1/1 | 99.0 | Fe | 25.4 Mn |
| | | | | 1/2 | 99.0 | Fe | 39.3 Mn |
| | | | Fe-Cr | Fe-Cr | | | |
| | | | | 25/1 | 99.0 | Fe | 0.70 Cr |

[1] Correction factors have to be applied for very widely differing operating temperatures.
[2] This table does not imply that feed material is necessarily introduced into the metal recovery control zone.
[3] (Wt. recovered/wt. fed)×100.
[4] Recovery of nickel, including cobalt-nickel-iron alloy from second furnace system is 99.5%.
[5] On a flux-free and gangue-free basis.

As noted above at least some of the externally introduced oxidizing agent should be introduced into the metal purity control zone. This requirement is dictated by the necessity of removing in the metal purity control zone a quantity of the more oxidizable elements entering that zone such that the desired enrichment of the liquid metal stream in respect to the desired metal is accomplished prior to removal of the liquid metal product.

If the oxidizing agent (e.g., oxygen) is capable of oxidizing both the desired metal and the more oxidizable elements in the metal purity control zone, some of the desired metal will be oxidized from the liquid metal phase into the oxidic slag phase in addition to the quantity of the more oxidizable elements oxidized.

If the oxidizing agent is an oxidic material rich in the oxide of the desired metal and is at a concentration which equals or exceeds the established critical control level, it will be capable of oxidizing the more oxidizable elements from the liquid metal phase into the liquid slag phase but oxidizing the more oxidizable elements at intermediate locations along either or both flow paths between the metal purity control zone and the metal recovery control zone. In those embodiments of the process where some of the agent containing available oxygen is distributed along the intermediate zone, the flow of oxidic slag leaving the metal purity control zone is not limited by the above mentioned minimum reflux ratio established for the case where all of the oxidic slag is produced near the ends of the flow paths in the metal purity control zone.

In the case of distributed introduction of the agent containing available oxygen, the amount of refluxing of oxidic slag from the metal purity control zone toward the metal recovery control zone is that quantity of slag sufficient to carry back the quantity of the more oxidizable metal removed from the liquid metal phase by oxidation into the oxidic slag phase at the established critical control level composition of said slag.

It was also noted above that at least some of an agent having reducing potential for the desired metal oxide must be introduced into the metal recovery control zone. If the agent having reducing potential for the desired metal oxide is a reducing agent such as carbon capable of reducing both the oxides of the desired metal and more oxidizable elements present in the oxidic slag phase, then in addition to the desired metal oxide reduced in the metal recovery control zone there will also be reduced therein some of the oxides of the more oxidizable elements present in the oxidic slag phase. If the agent having reducing potential for the desired metal oxide is a metalliferous feed material such as a metallic alloy of the desired metal and more oxidizable elements, then the more oxidizable elements present in said metalliferous feed material may be capable of reducing the oxide of the desired metal from the liquid slag phase into the liquid metal phase. The more oxidizable elements present in the metalliferous feed will not, however, be capable of reducing their own oxides but only the desired metal oxide and oxides of other elements which are less readily oxidizable than themselves. For either type of reducing agent, i.e., carbon or a metal alloy, a net flow of liquid metal will be produced in the metal recovery control zone which will flow back from that zone toward the metal purity control zone. For the case in which all of the reducing agent having a reducing potential for the desired metal oxide is introduced into the metal recovery control zone there will be a minimum reflux ratio required (flow of liquid metal leaving that zone divided by flow of oxidic slag removed from the process). For a binary feed, this minimum reflux will be a function of the type (oxide or metal) and the composition of metalliferous feed material and the relative reducibility of the metallic elements present in the metalliferous feed material and the refluxing of oxidic slag from the metal purity control zone toward the metal recovery control zone. The amount of such agent having reducing potential for the desired metal oxide must be sufficient to reduce from the oxidic slag entering the metal recovery control zone a quantity of the desired metal oxide sufficient to decrease the desired metal element content in the oxidic slag removed to obtain the desired metal. Again, for metalliferous feeds containing more than two metallic elements there may be more than one minimum reflux ratio.

As noted above, it also is possible to add an agent having reducing potential for the desired metal oxide at intermediate points in the intermediate zone in order to reduce a significant portion of the desired metal oxide present in the oxidic slag prior to its entry into the metal recovery control zone. For this distributed introduction of a reducing agent, the amount of refluxing of liquid metal from the metal recovery control zone toward the metal purity control zone is that quantity of metal sufficient to carry back the quantity of the desired metal reduced from the oxidic slag phase into the liquid metal phase at the established critical control level composition of said liquid metal.

As previously stated, there may be present in the process an intermediate zone between the metal purity control zone and the metal recovery control zone. Normally the metalliferous feed material will be introduced into at least one of the flow paths between the metal purity control zone and the metal recovery control zone at a point, or into an operating stage, such that the composition of the feed material is appropriate to the point or stage of introduction. Thus if an oxidic metalliferous feed is introduced into the oxidic slag flow path, in which the concentration of the oxide of the desired metal is being decreased continuously as the oxidic slag flows from the metal purity control zone toward the metal recovery control zone, the oxidic feed material can be introduced at a point where its composition matches as closely as possible the composition of the oxidic slag phase. Similarly, if an oxidic metalliferous feed material is introduced into an operating stage in which a step change is being effected between the concentration of the desired metal oxide in the slag phase entering and leaving that stage, the composition of the oxidic metalliferous feed material can be intermediate to the compositions in the slag entering and leaving that stage. Similarly where the metalliferous feed material is a metal alloy, the feed can be introduced into the liquid metal flow path between the metal recovery control zone and the metal purity control zone at a point where its composition matches the composition of the liquid metal as nearly as possible. As explained above, the agents containing available oxygen for oxidizing the more oxidizable elements or having reducing potential for the desired metal oxide, may themselves be metalliferous feed materials introduced into either the metal purity control zone or the metal recovery control zone. In these cases at least some of the metalliferous feed material can be introduced into the metal purity control zone or the metal recovery control zone. In general, it is deemed desirable to introduce most if not all of the metalliferous feed into the intermediate zone.

The process of the invention of producing metals in high purity and high yield from metalliferous materials will be best understood from the following detailed discussion of certain specific embodiments which are described with reference to the furnace systems shown in the accompanying drawings. It is to be understood, however, that the embodiments given in the following examples are solely for the purpose of illustrating the invention and are not to be construed as limiting the scope thereof.

In the description that follows of specific examples of applications for this new process for separating and recovering a desired metal from metalliferous materials, such as ores and alloys, reference will be made to certain steps that may be taken to separate and recover at least one additional metal in high yield. Such additional metal or metals may be procured from a single continuous process either in pure form or in some cases alloyed in a controlled fashion with one or more other metals which are present in the metalliferous materials. Also, the process lends itself to a continuous separation and recovery of certain vaporizable constituents of the metalliferous feed. Also, the process lends itself to continuous removal from gas flows involved in the process such particulate material as may be produced during the carrying out of the process. Thus the process lends itself ideally to the providing of means for producing various byproducts in addition to the desired metal and for separation of vaporizable material and particulate materials which could otherwise contaminate the atmosphere.

As previously noted, certain impurities are difficult to remove from the desired metal element to low levels since the affinity for oxygen of the impurities and the metal are not sufficiently different. Such impurities, not included in the definition of a "more oxidizable element," require the addition of an active flux, which preferentially reacts with such impurities rather than the desired metal, for lowering the impurity concentration to an acceptable value for certain applications of the metal product. As part of the overall system of the invention, treatment with suitable reactive fluxes may be employed to recover the desired metal element in a low concentration of such impurities. Typical undesirable impurities of this type include phosphorus or sulfur in the formation of a pure iron or steel and arsenic, antimony, sulfur and bismuth in the formation of a pure copper metal. Any flux may be employed which is reactive with such impurities to drive the same from the metal phase into the slag phase. Such fluxes are generally basic in nature and may include the oxides and carbonates of reactive metals such as calcium oxide or sodium carbonate and, if necessary, may be used in conjunction with a non-reactive fluidity-assisting flux, such as fluorspar ($CaF_2$).

In general, the flux may be added in the metal purity control zone of the process of this invention or, to lower the impurity concentrations to very low levels, the liquid metal from the metal separation zone may be fed to a subsequent impurity separation zone to which the flux and an oxidizing agent are added to react with the impurities.

By way of example, in the purification of copper from copper-bearing feeds reactive fluxes, such as sodium carbonate or calcium oxide, may be added to the metal purity control zone along with the oxidizing agent present thereat to remove arsenic or antimony. Since sodium carbonate is quite corrosive to ordinary refractories, it may be preferable to use a flux comprising calcium oxide and fluorspar instead of, or in conjunction with, the sodium carbonate. By using any of these fluxes together with an oxidizing agent, the arsenic and antimony present in the copper are converted into arsenates and antimonates which are flushed out with slag. There is a certain amount of unavoidable reduction of the arsenates and antimonates from the slag phase back into the metal phase in the metal recovery control zone with some recycling of these impurities.

To even further lower the concentration of the aforementioned impurities in the copper system, the liquid copper metal from the metal separation zone may be fed to an impurity separation zone to which is added an oxidizing agent and a flux of the aforementioned type. The slag formed in the impurity separation zone containing the arsenates and antimonates may be removed and discarded. The copper removed from the metal phase will thus be extremely low in arsenic and antimony, with the sacrifice of a certain amount of copper recovery since the conditions in the impurity separation zone are such as to oxidize a certain amount of copper into the slag phase. Therefore, this system should be only used when it is important to produce a copper metal at a very low concentration of arsenic and antimony.

The treatment of iron removed from a furnace system of the invention for the lowering of the phosphorus content is quite analogous to that described above for the removal of arsenic and antimony from copper. The removal of phosphorus is an important problem in the making of a high quality steel and is complicated by the fact that iron and phosphorus have nearly the same affinity for oxygen. Therefore, the aforementioned basic fluxes are added which promote the oxidation of phosphorus preferentially to iron. A representative reaction with the use of calcium oxide as a flux is as follows:

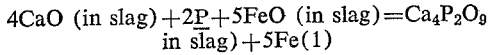

$$4CaO \text{ (in slag)} + 2\underline{P} + 5FeO \text{ (in slag)} = Ca_4P_2O_9 \text{ in slag} + 5Fe \quad (1)$$

In one method the flux is added in the metal purity control zone. Disadvantages in prior art processes are that any silica (silicon dioxide) present in the slag tends to react with calcium oxide to form a complex and thus diminish the effect of the calcium oxide and that silica dilutes the iron oxide and calcium oxide so that more of these latter two are required. In this invention, most of the silicon is oxidized out of the metal before it reaches the metal purity control zone so the slag therein has a relatively low silica content. Consequently, such prior art disadvantages are minimized. Furthermore, treatment with the flux in the furnace system of the invention is particularly efficient since such treatment requires the slag layer to be relatively rich in iron oxides (on the order of 15%) which must be maintained, in any event, in the furnace system. In the absence of silica in the metal purity control zone only a small amount of flux is required and a highly efficient removal of phosphorus is obtained with very low iron loss. Of course, as with the copper system, there is a possibility of some phosphorus reversion to the metal phase in the metal recovery control zone.

As with the copper system, the flux may be added along with an oxidizing agent to a separate impurity separation zone to avoid the detrimental effects of the silica on phosphorus removal. A liquid metal from the metal separation zone is fed into the impurity separation zone wherein the basic reactive flux, such as calcium oxide, is added along with the oxidizing agent, such as oxygen and, if necessary, a fluidizing flux, such as fluorspar. The slag formed in the impurity separation zone containing phosphates may be removed and discarded. As previously mentioned, one advantage of this system is that the interfering silicon is first removed in the furnace system and so does not interfere with the flux reaction.

One important feature of the invention is that the aforementioned variables are adjusted so that the slag phase leaving the metal purity control zone carries a substantial level or percentage of the desired metal element in oxide form. This is accomplished by the presence in the metal purity control zone of "over oxidizing" conditions (i.e., an oxidation environment sufficient to oxidize the more oxidizable element and which in most, but not all, cases will also oxidize a significant portion of the desired metal element). For example, it is desirable for high purity to have a ratio of at least 1:3 of the weight of the oxide of the desired metal to the combined weights of the oxides of the more oxidizable elements. This over-oxidation supplies a driving force to assure the oxidation of and thus removal from the metal phase of all but an insignificant quantity of the more oxidizable elements to produce a product of exceptional purity.

In order to recover a high yield of the desired metal element even though its oxide may be found in the slag phase at a substantial level or percentage in the metal purity control zone, it is necessary to impoverish the slag with respect to the oxide of the desired metal in the metal recovery control zone. To do so, "over-reducing" conditions are maintained in the metal recovery control zone to provide a driving force to reduce substantially all of the oxide of the desired metal into the metal phase. The reducing conditions may reduce a significant portion of the more oxidizable element into the metal phase which proceeds in the metal phase along with the desired metal element towards the metal purity control zone wherein substantially all of the more oxidizable element is oxidized into the slag phase.

In general, the values of the $p_{CO_2}/p_{CO}$ ratio which would be in equilibrium with the metal and slag compositions is affected by the presence in the slag phase of a fluxing material. The presence of an "ideal" non-reactive fluxing material (one of which forms nearly ideal solutions with the metallic oxides) in the slag phase, will dilute the composition of the desired metal oxide and that of other oxides present. Thus, if an ideal non-reactive flux is present which dilutes the mol percentage of the desired metal oxide to 75% of its unfluxed value, the $p_{CO_2}/p_{CO}$ ratio in equilibrium with the metal and slag compositions would be 75% of its value without flux. The presence of a non-ideal or reactive flux in the slag alters the equilibrium $p_{CO_2}/p_{CO}$ ratio to a greater or less extent than the aforementioned ideal dilution effect, depending upon activities or the extent of the flux reaction. Thus, the proper adjusted equilibrium $p_{CO_2}/p_{CO}$ value is found by calculations taking this variable into effect or by trial and error.

In the following examples, reference to specific values of $p_{CO_2}/p_{CO}$ in the effluent gases is based on values in equilibrium with the liquid phase for a desired result. In actual practice, a driving force is required for either oxidation or reduction. Thus, when adding an oxidizing agent, the $p_{CO_2}/p_{CO}$ level should be at least, and preferably greater than, the specified equilibrium value. Likewise, when adding a reducing agent, the $p_{CO_2}/p_{CO}$ ratio should be no greater than, and preferably less than, the specified equilibrium value.

Furthermore, as previously discussed, the compositions and purities specified for the feed material, products and liquid slag and metal phases in the examples are based upon values in the absence of any foreign elements or impurities, such as flux or gangue, not specifically disclosed and discussed in percentages in a particular example.

EXAMPLE 1

A furnace system of the type illustrated in FIGS. 2 and 3 is employed for the processing of a metalliferous material A comprising 4.95% by weight nickel oxide (NiO) and 95.05% by weight iron oxide (FeO). On a basis of 128.6 pounds of mixed oxide feed, there is 5 pounds of elemental nickel and 95 pounds of elemental iron. This feed is premelted in vessel 30 with heat from fuel gas and oxygen entering feed tube 32 and with auxiliary heat from an electric arc. A temperature on the order of 1900° K is maintained in the melting vessel. The hot gases exiting into recovery system 33 are controlled in composition to provide a $p_{CO_2}/p_{CO}$ ratio greater than about 1.05 when it is desired to melt but not reduce the metal oxides. Alternatively, by lowering the $p_{CO_2}/p_{CO}$ ratio to below about 1.05, but substantially above about 0.176 (the level of reduction of FeO) it is possible to reduce some of the oxides into a liquid metal phase recoverable from metal outlet spout 37 with a nickel content higher than that of the oxide fed, thus achieving an initial partial separation of the desired metal, nickel, from the more oxidizable element, iron.

The melted liquid oxidic slag material flowing from the melting vessel 30 is introduced through slag outlet duct 38 into the vessel 39 containing a portion of the intermediate zone 13. The vessel 39 contains a liquid slag phase F and a liquid metal phase G in intimate contact therewith.

Oxygen B, fuel gas H and nonreactive gas C are introduced through inlet tube 40 to produce heating, to promote agitation and mixing between the liquid slag and liquid metal phases and to maintain the desired operating conditions. The hot effluent gases from vessel 39 should have a $p_{CO_2}/p_{CO}$ ratio between about 14.8 and 0.18. The temperature and composition of the effluent gases are used to proportion the feed of oxygen B and fuel gas H. The total flow of gases B and H is regulated to control heat input into the vessel.

The liquid slag phase containing NiO and FeO is caused to flow in a flow path extending between and including the metal separation zone 11, the metal purity control zone 12, the intermediate zone 13, the metal recovery control zone 14 and the slag separation zone 15 and the slag removal spout 57. A non-reactive fluxing material E, such as fluorspar, is added to the slag through feed tube 64 of zone 12.

The liquid metal phase containing liquid nickel, liquid iron and some carbon and oxygen dissolved in the liquid metal, is caused to flow in a flow path extending between and including slag separation zone 15, the metal recovery control zone 14, the intermediate zone 13, the metal purity control zone 12, the metal separation zone 11 and the metal removal spout 73.

The number of theoretical stages required to achieve a purity of 99.8 weight percent nickel with a yield of 99.0 percent is 5.12 based on a reducibility ratio of 101 for the NiO-FeO-Ni-Fe metal oxide-metal system at 1900° K. and a reflux ratio of about 0.50 pound of elemental nickel and elemental iron contained in slag leaving the metal purity control zone per pound of liquid metal removed. This is calculated stage-by-stage assuming equilibrium in each stage. Thus, the number of operating stages required is six or more for this example, with the actual number depending upon stage efficiency (i.e., the proximity to equilibrium). The reflux ratio from the metal recovery control zone is about 0.061 pound of liquid metal per pound of liquid slag removed.

Figure 6:
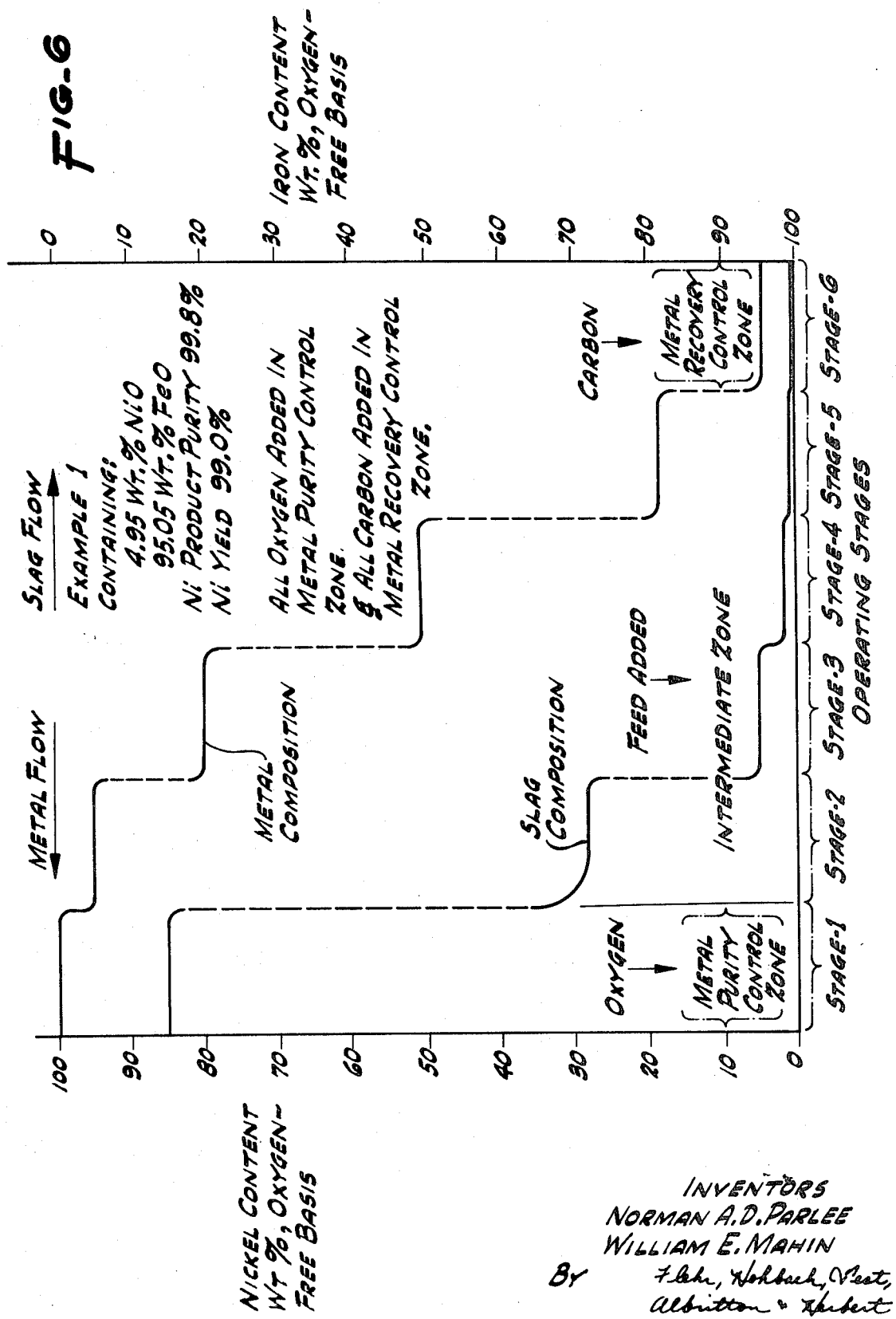
FIG. 6 is a chart which is specifically based on Example 1, but which shows typical results for the metal content of the metal phase and slag phase at various operating stages when practicing the invention in a furnace system, such as shown in FIG. 2.

Referring to the chart of FIG. 6, the percent nickel content in the composition of the liquid metal phase increases in steps as the liquid metal progresses from the metal recovery control zone through the intermediate zone and finally through the metal purity control zone. In contrast, the percent contained elemental nickel in the liquid oxidic slag composition decreases in steps as the slag flow progresses from the metal purity control zone through the intermediate zone and finally through the metal recovery control zone. FIG. 6 is based on a furnace system having six operating stages. All of the externally added oxygen is introduced into the metal purity control zone, contained in vessel 63 of FIG. 2 and all of the externally added carbon is introduced into the metal recovery control zone contained in vessel 51 of FIG. 2. The premelted liquid oxidic feed is introduced into operating stage 3 contained in vessel 39 located in the intermediate zone.

The liquid slag in the metal purity control zone contains about 85 weight percent nickel on an oxygen-free basis, which exceeds the critical control level of 83.1 weight percent nickel shown in Table III as being required to obtain a liquid metal product at a nickel purity level of 99.8 percent.

With reference to FIGS. 2 and 3, the desired control level of about 85 weight percent contained nickel as NiO is maintained while introducing oxygen B through lance 66 into vessel 63. The oxygen impinges on the oxidic slag at a velocity sufficient to channel through the slag phase and penetrate into or onto the liquid metal phase. This penetration allows intimate contact of the oxygen with the liquid metal phase and promotes both agitation of the two liquid phases and the oxidation of both iron and nickel from the liquid metal phase. A nonreactive gas C, such as nitrogen, may be added to the oxygen flow via lance 66 to obtain the desired gas velocity impinging into the slag phase. Fuel gas H is introduced, as required, to maintain the desired temperature and supply a quantity of carbonaceous gas in the vessel in order to measure by sensing element 47 the $p_{CO_2}/p_{CO}$ ratio in the effluent gases. Thus, there are four separate functions which may be provided by regulating a flow of oxygen, fuel gas and nonreactive gas, respectively, into vessel 63, namely: oxidation of the metal, agitation of the two liquid phases, heating, and maintaining a presence in the atmosphere of sufficient $CO_2$ and $CO$ to provide chemical control of the operation through regulating the $p_{CO_2}/p_{CO}$ ratio in the effluent gases.

The two liquid phases may be agitated by various means including: injection of nitrogen or other nonreactive gases (which could include appropriate mixtures of $CO_2$ and $CO$ or $H_2O$ and $H_2$) into the liquid; insertion of a carbonaceous material into the liquid metal which will generate gas bubbles by reaction with dissolved oxygen in the liquid metal; the intermittent injection of carbonaceous gases into the liquid metal to cause a reaction with dissolved oxygen thereby generating gas bubbles; electromagnetic stirring and ultrasonic vibration.

The $p_{CO_2}/p_{CO}$ ratio in the effluent gases leaving the metal purity control zone 12 is about 14.8 when the nickel oxide content of the slag is maintained at the desired control level. The use of a flux will require an adjustment in the $p_{CO_2}/p_{CO}$ ratio to maintain the desired metal purity. For example, if an ideal nonreactive flux is added to the extent that the mol percent of NiO plus FeO is reduced to 75% in the slag, then the $p_{CO_2}/p_{CO}$ ratio must be reduced to 75% of the unfluxed case, i.e., to about 11.2.

A temperature of about 1900° K. is maintained in the liquid slag phase F and the liquid metal phase G within vessel 63. At this temperature, the dissolved carbon is about $1.5 \times 10^{-5}$ weight percent and the dissolved oxygen content will be about 0.7 weight percent in the liquid metal phase under the conditions maintained in the metal purity control zone.

In order to increase the fluidity of the liquid slag phase at 1900° K., about one pound of a non-reactive fluxing material $CaF_2$ (fluorspar), per pound of elemental nickel contained in the refluxed slag, is introduced into the metal purity control zone through feed tube 64. The amount of fluxing material introduced will depend upon the operating temperature level, on the reflux ratio of slag from the metal purity control zone to the metal recoverey control zone and on the composition of the slag leaving vessel 63. Other fluxing materials include $SiO_2$ (silica), $Al_2O_3$ (alumina), BaO (baryta), CaO (lime) or mixtures of these materials.

The liquid slag phase leaving vessel 63 flows to vessel 51 and the liquid metal phase leaving vessel 51 flows to vessel 63, each phase flowing through a series of four interconnected vessels similar to and including the feed vessel 39. These four interconnected vessels contain the operating stages of the intermediate zone. Gaseous oxygen, fuel gas, and nonreactive gas are introduced into each of these intermediate zone vessels to maintain the operating temperatures at about 1900° K. and to promote intraphase mixing and interphase contact. The mixtures of the gases introduced are essentially neutral with respect to the oxidation-reduction reaction within the respective operating stages (i.e., the $p_{CO_2}/p_{CO}$ ratio of the gaseous mixture introduced into each intermediate zone vessel will be essentially the same as that of the gases leaving the vessel). Throughout this intermediate zone, nickel oxide acts as a carrier of oxygen and is capable of oxidizing the more oxidizable element, iron, from the liquid metal phase into the liquid slag phase. Approximately one mol of nickel will be reduced simultaneously with the oxidation of one mole of iron.

Since nickel and iron have very nearly the same atomic weight this will result in approximately one pound of nickel being reduced from the slag phase for each pound of iron oxidized from the liquid metal phase in each of the four vessels comprising the operating stages of the intermediate zone.

The liquid slag flow will be essentially constant from the metal purity control zone to the feed vessel 39 wherein the flow will increase by the amount of premelted liquid oxidic slag feed. Upon leaving vessel 39, flow will again be generally constant until it reaches the metal recovery control zone contained in vessel 51. The flow of liquid metal will remain essentially constant from the metal recovery control zone through the entire intermediate zone until it arrives at the metal purity control zone.

The $p_{CO_2}/p_{CO}$ ratio in the effluent gas from each of the four vessels in the intermediate zone will be less than 14.8 and greater than 0.18 with the ratio decreasing progressively from the vessel nearest the metal purity control zone 12 to the vessel nearest the metal recovery control zone 14.

The liquid metal in the metal recovery control zone located within vessel 51 contains about 96% iron. This exceeds the control level of 95% shown in Table III as required for a recovery of 99.0% of the nickel fed for the nickel-iron system.

Carbon is introduced as a reducing agent through feed tube 52 into vessel 51 for reduction of the required amount of oxide (FeO) of the more oxidizable element (Fe) into the liquid metal phase. A temperature of 1900° K. is maintained with vessel 51 by combustion of gases introduced in tube 53. These gases promote mixing of the two liquid phases therein dispersing the carbon throughout the slag phase, thereby assisting the reduction reaction and maintaining the desired $p_{CO_2}/p_{CO}$ ratio at a value of about 0.18 in the effluent gases. For this ratio, the liquid metal phase includes about 0.008 weight percent of dissolved carbon and about 0.22 weight percent of dissolved oxygen.

Since the reduction process within the metal recovery control zone is likely to be endothermic, electric arc or induction heating of the liquid metal phase is used as a supplementary means of maintaining temperature.

Entrained droplets of reduced liquid metal in the liquid slag phase leaving the metal recovery control zone which have not completely settled are removed in the slag separation zone 15 contained in vessel 56. Oxygen and fuel gas are introduced into vessel 56 through burner 59 to control the $p_{CO_2}/p_{CO}$ ratio at approximately 0.18. The liquid metal phase is maintained at the desired temperature of 1900° K.

The liquid metal product removed from the furnace system through metal removal spout 73 is at a purity level of about 99.8 weight percent nickel and contains about 4.95 pounds of nickel and 0.01 pound of iron, or a total of about 4.96 pounds of liquid metal for each 100.00 pounds of contained metal elements fed to the furnace system. The liquid oxidic slag removed from the furnace system through the slag removal spout 57 contains about 0.05 pound of elemental nickel and about 94.99 pounds of elemental iron, both elements being in the oxide form for each hundred pounds of contained metal elements fed. The nickel recovery is about 4.95 pounds in the removed liquid metal out of 5.00 pounds fed, or 99.0 percent. The total liquid oxidic slag removed from the furnace system is about 122.27 pounds for each hundred pounds of contained metal elements fed to the furnace system.

EXAMPLE 2

An oxidic feed material containing iron oxide and nickel oxide in the proportions of Example 1 compositions is processed as in Example 1 to yield the desired metal element, nickel, at a purity of 99.8%. The liquid slag removed at spout 57 from the furnace system of Example 1 (shown in FIG. 2) flows to secondary metal recovery control zone 74, contained in vessel 77 (illustrated in FIG. 5) for recovery of the iron in elemental form.

Referring to FIG. 5, the slag phase entering vessel 77 contains 94.99 pounds of elemental iron and 0.05 pound of elemental nickel, both in the oxide form, plus approximately 2.06 pounds of fluorspar flux (added in the metal purity control zone of Example 1). Carbon is introduced through feed tube 78 to reduce most of the FeO contained in the liquid slag phase into iron thereby forming the liquid metal phase.

The temperature and the $p_{CO_2}/p_{CO}$ ratio of the effluent gases leaving the secondary metal recovery control zone are measured to control the rates of introducing carbon, natural gas, oxygen, nonreactive gas and supplementary heating means to maintain the 1900° K. operating temperature and the desired $p_{CO_2}/p_{CO}$ ratio. At a $p_{CO_2}/p_{CO}$ ratio of about 0.018 in the effluent gases the liquid metal phase will contain about 0.10 percent carbon. By significantly increasing this $p_{CO_2}/p_{CO}$ ratio, the dissolved carbon in the liquid metal phase will be decreased but the recovery of the iron reduced to the liquid metal phase will also be decreased. Conversely, if the $p_{CO_2}/p_{CO}$ ratio is significantly decreased, the dissolved carbon will be greater e.g., about 1.00 weight percent carbon at a $p_{CO_2}/p_{CO}$ ratio of 0.0015.

The secondary metal, iron, removed from metal separation zone 11 through spout 73 contains approximately 94.69 pounds of iron, 0.05 pound of nickel, and 0.10 pound of dissolved carbon. Thus, the recovered secondary metal is at a purity level of about 99.85 weight percent iron with about 0.10 weight percent dissolved carbon. The slag removed from slag separation zone 15 through spout 57 contains approximately 2.06 pounds of flux material and 0.38 pound of residual iron oxide. The overall recovery of iron from the metalliferous oxidic material fed to the melting vessel of Example 1 is 99.68%.

EXAMPLE 3

Referring to FIG. 1, a shotted, pre-reduced metallic feed containing 75.0 weight percent iron and 25.0 weight percent nickel (on a carbon and silicon-free basis) is fed into a furnace system comprising an elongated vessel 10 which contains each of zones 11, 12, 13, 14, and 15. Approximately ⅔ of the feed is preheated and introduced through feed tube 16 at a point in the intermediate zone 13. The remaining ⅓ of the feed is premelted and introduced through feed tube 17 into the metal recovery control zone 15 and serves as an agent having potential for reducing NiO from the liquid slag phase into the liquid metal phase.

The premelted metal feed is partially oxidized near the point of its introduction into the intermediate zone by introducing oxygen through feed tube 19. A considerable portion of the metallic iron contained in the feed will be oxidized from the liquid metal phase into the liquid oxidic slag phase at that point. One advantage of this partial oxidation is that it decreases the amount of NiO rich slag which is generated by further introduction of oxygen through duct 18 into the metal purity control zone 12. Another advantage of the partial oxidation of the metal fed into the intermediate zone is that the gases released by oxidation of the carbon contained in the metal will be at a location substantially away from the liquid metal and liquid slag removal points. These evolved gases could otherwise create serious problems in obtaining good separation of the liquid metal and liquid slag phases in slag separation zone 15.

The liquid slag in the metal purity control zone 12 is maintained at a composition such that the weight percent NiO exceeds the control level of 83.1 weight percent NiO shown in Table III as being required to obtain a liquid metal product at a nickel purity level of 99.8 percent.

The liquid metal in the metal recovery control zone 14 is maintained at a composition such that the weight percent iron in the liquid metal phase exceeds the control level of 75 weight percent iron shown in Table III as being required to obtain 99.0 percent recovery of the nickel fed into the furnace system. Carbon, introduced through feed tube 21 into the metal recovery control zone 14, supplements the reducing potential of the metal feed in order to obtain the 99.0 percent nickel recovery.

Pre-reduced metallic feed materials such as ferro-nickel alloy typically may contain about 2.5% silicon and about 1.5% carbon by weight. With such a metallic feed material the quantity of carbon required to be introduced into the metal recovery control zone may be small.

The liquid product metal is removed from the furnace at a purity level of approximately 99.8 weight percent nickel, the desired metal. For each one hundred pounds of combined metal feeds approximately 24.8 pounds of liquid product metal is removed, which represents a recovery of approximately 99.0 percent of the nickel content in the feed. The liquid slag removed contains approximately 74.95 pounds of elemental iron and 0.25 pound of elemental nickel, both in the oxide form, for each one hundred pounds of combined metal feeds. In addition, the liquid slag removed from the furnace system contains essentially all of the flux material introduced through feed tube 22 into the metal purity control zone 12.

EXAMPLE 4

Figure 7:
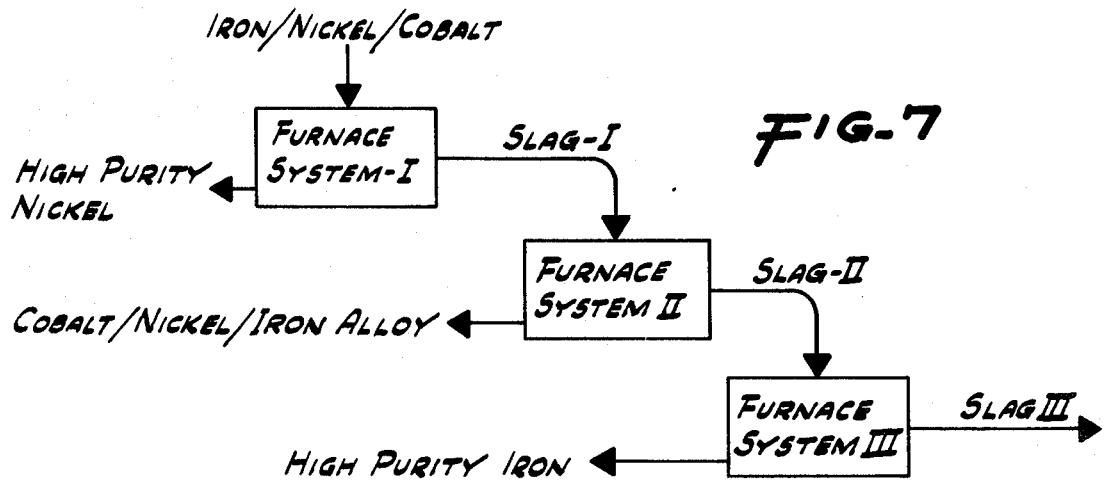
FIG. 7 is a diagram showing a procedure for processing a metalliferous material containing iron, nickel and cobalt according to the invention.

A procedure is carried out as shown schematically in FIG. 7 in which the furnace systems and operations followed in Furnace Systems I and II are generally the same as those discussed in Example 1. Of course, the actual operating conditions will vary depending upon the feed material. Furnace System III is generally similar to secondary metal recovery control zone 74 of FIG. 5 and its operation and conditions are generally the same as those discussed for zone 74 in Example 2. An oxidic material having the following composition: iron oxide (FeO) 97.28% by weight, nickel oxide (NiO) 2.47% by weight and cobalt oxide (CoO) 0.25% by weight is premelted and fed into Furnace System I. Based on 128.61 pounds of mixed oxide feed, this material contains approximately 97.25 pounds of iron, 2.50 pounds of nickel and 0.25 pound of cobalt. The liquid product metal removed from Furnace System I is at a purity level of 99.8% by weight nickel, contains 0.1% by weight of cobalt and 0.1% by weight of iron, or approximately 2.29 pounds of nickel for each 100.00 pounds of contained metal elements fed to Furnace System I. The nickel recovery in Furnace System I is 2.29 pounds out of 2.50 pounds fed, or approximately 92.0 percent.

The concentration of nickel oxide in the slag in the metal purity control zone in Furnace System I exceeds the critical control level of 90.48 weight percent NiO shown in Table III. The concentrations of iron and cobalt in the metal in the metal recovery control zone in Furnace System I exceed the control levels of 78.5 weight percent Fe and 4.5 weight percent Co shown in Table III.

The Slag I removed from Furnace System I serves as the feed material introduced into Furnace System II. About 99 percent of the cobalt contained in the oxidic feed material to Furnace System I is carried over with Slag I to Furnace System II. The liquid Slag I removed from Furnace System I has the following composition: iron oxide (FeO) 99.55% by weight, nickel oxide (NiO) 0.21% by weight and cobalt oxide (CoO) 0.24% by weight (excluding flux).

The liquid product metal removed from Furnace System II is an alloy of cobalt, nickel and iron having a composition of approximately 45.0% by weight cobalt, 45.0% by weight nickel and 10.0% by weight iron. Approximately 0.43 pound of this alloy is removed from Furnace System II for each 100.00 pounds of contained metal elements fed to Furnace System I. The total quantity of nickel recovered in the liquid metal products of Furnace Systems I and II is approximately 99.5% of the nickel contained in the feed to Furnace System I. The cobalt content of the alloy removed from Furnace System II is approximately 0.19 pound, for each 0.25 pound of cobalt contained in 128.61 pounds of the mixed oxides fed to Furnace System I, or a cobalt recovery of approximately 76 percent.

The Slag II removed from Furnace System II serves as the feed material introduced into Furnace System III containing the tertiary metal recovery control zone. This liquid Slag II has the following composition: iron oxide (FeO) 99.93% by weight, nickel oxide (NiO) 0.013% by weight and cobalt oxide (CoO) 0.057% by weight (excluding flux). The liquid metal removed from Furnace System III is high purity iron containing approximately 96.91 pounds of iron, 0.06 pound of cobalt, 0.01 pound nickel and 0.10 pound of dissolved carbon. Thus, the recovered tertiary metal is at a purity level of 99.83 weight percent iron with 0.10 weight percent of dissolved carbon. The Slag III removed from the Tertiary Metal Recovery Control Zone contains the flux material added in the metal purity control zone of Furnace System I and 0.38 pound of residual iron oxide. The recovery of iron from the mixed oxides fed to Furnace System I is approximately 99.65%.

EXAMPLE 5

Figure 8:
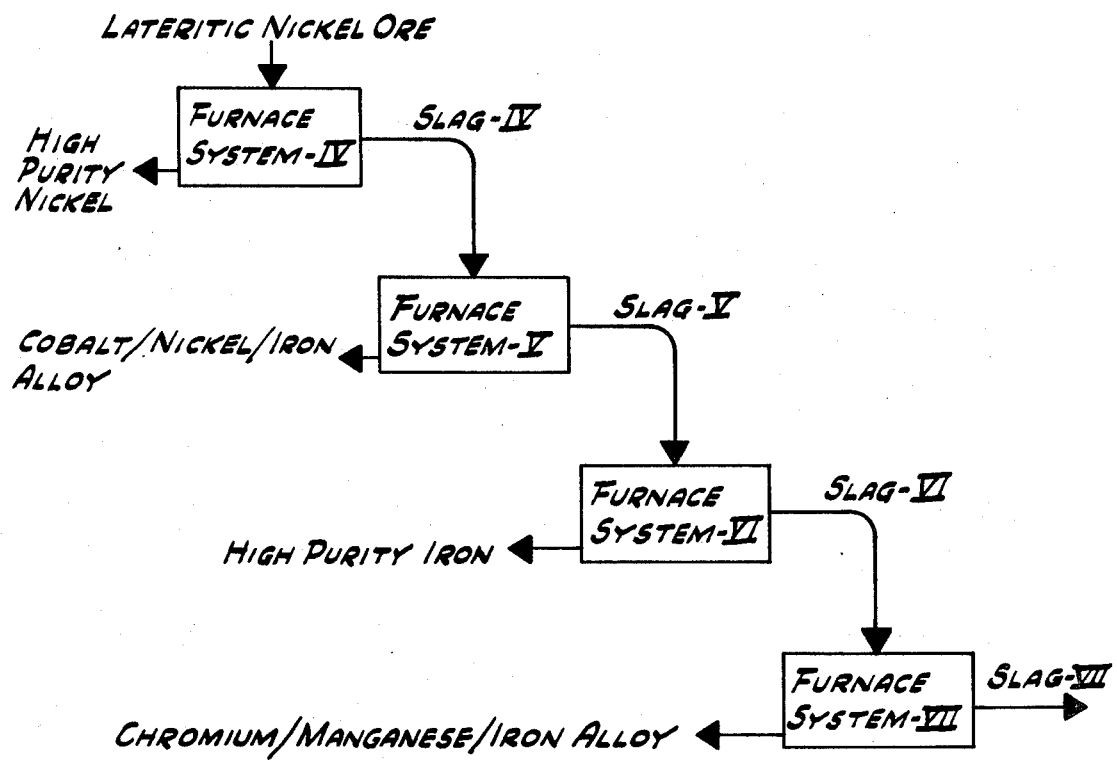
FIG. 8 is a diagram showing a procedure for treating a lateritic nickel ore according to the invention.

Referring to FIG. 8, a lateritic nickel ore is premelted and fed into Furnace System IV. The composition of the premelted lateritic nickel ore concentrate is as follows:

| | Percent by weight |
|---|---|
| FeO | 80.05 |
| NiO | 1.98 |
| CoO | 0.16 |
| MnO | 1.12 |
| $Cr_2O_3$ | 3.64 |
| Gangue | 13.05 |

The gangue material contained in the lateritic nickel ore is a mixture of alumina, magnesia and silica.

The premelted nickel ore is processed by four Furnace Systems, IV, V, VI and VII arranged in series so that the effluent slag removed from Furnace System IV is fed to Furnace System V, etc. Four liquid product metals are removed from the respective furnace systems.

The liquid metal product from Furnace System IV is high purity nickel at a purity level of 99.8% by weight.

This high purity nickel also contains about 0.1% by weight cobalt and 0.1% by weight iron.

The liquid metal product from Furnace System V is an alloy of nickel, cobalt and iron having a composition of approximately 46.7% by weight nickel, 42.3% by weight cobalt, and 11.0% by weight iron.

The liquid metal product from Furnace System VI is high purity iron having approximately the following composition (excluding dissolved carbon):

| | Percent by weight |
|---|---|
| Iron (Fe) | 99.75 |
| Chromium (Cr) | 0.16 |
| Manganese (Mn) | 0.04 |
| Cobalt (Co) | 0.04 |
| Nickel (Ni) | 0.01 |

The liquid metal product from Furnace System VII is an alloy having approximately the following composition: chromium 70.0% by weight, manganese 20.0% by weight and iron 10.0% by weight (excluding dissolved carbon and silicon).

The product quantities of each of these liquid metals per houndred pounds of lateritic nickel ore fed to Furnace System IV are:

| | Lb. |
|---|---|
| High purity nickel | 1.43 |
| Co/Ni/Fe alloy | 0.25 |
| High purity iron | 62.06 |
| Cr/Mn/Fe alloy | 3.14 |

The Slag VII from Furnace System VII contains essentially all of the gangue materials introduced by the lateritic nickel ore fed to Furnace System IV; plus approximately 0.28 pounds of $Cr_2O_3$, 0.06 pound of MnO (both per hundred pounds of lateritic nickel ore feed) plus any fluxing material which may be added to maintain the fluidity of the liquid slag phase in any of the furnace systems. Since the feed material contains a substantial amount of gangue material, it may be unnecessary to add any additional fluxing material, except perhaps in the metal purity control zone of Furnace System IV.

EXAMPLE 6

Employing the apparatus of FIGS. 2 and 3, a sulfidic copper concentrate is processed having an approximate composition of copper 30 weight percent, iron 30 weight percent, sulfur 25 weight percent, and silica 15 weight percent and also containing 0.00007 pound of gold and 0.00035 pound of silver per hundred pounds of metalliferous feed. Within vessel 30, the feed material is melted and treated to transform the sulfides of iron and copper mainly to their oxides with essentially all of the sulfur being oxidized to $SO_2$ gas. The balance of the feed material is simultaneously obtained as a liquid metal fraction containing metallic copper and the precious metals, gold and silver. The composition of the hot effluent gases is controlled so that the $p_{CO_2}/p_{CO}$ ratio is about 58 at 1900° K.

Under these controlled conditions, approximately 1.0 pound of copper per hundred pounds of feed is produced and collected in the liquid metal phase removed from vessel 30. The precious metals, silver and gold, also will be recovered along with the copper in the liquid metal removed as a copper fraction rich in precious metal. This fraction, containing about 0.02 weight percent iron, 0.035 weight percent silver and 0.007 weight percent gold, is subsequently subjected to further refining to separate the gold, silver and copper contained therein.

The liquid oxidic material flowing from vessel 30 has a composition of approximately 37.8 weight percent $Cu_2O$, 45.0 weight percent FeO and 17.2 weight percent $SiO_2$. This liquid oxidic material is introduced into feed vessel 39 located in the intermediate zone 13 of the furnace system shown in FIG. 2.

The liquid metal removed from the furnace system contains approximately 28.69 pounds of the desired metal, copper, and approximately 0.003 pound of iron per hundred pounds of the sulfidic copper concentrate. The dissolved oxygen content of the liquid metal is approximately 2.5 weight percent oxygen when the metal purity control zone is operated at 1900° K. with a $p_{CO_2}/p_{CO}$ ratio in the effluent gases at about 114. A subsequent deoxidation (not shown) of the liquid metal yields a product approximately 99.99 weight percent copper. The recovery of copper is approximately 99.0 percent, including the copper content of the precious-metal-rich fraction and the product liquid metal. The liquid slag in the metal purity control zone contains about 67 weight percent $Cu_2O$, which exceeds the critical control level of 65 weight percent $Cu_2O$ shown in Table III as being required to obtain a liquid metal product at a copper purity level of 99.99 weight percent (excluding dissolved oxygen) for 1900° K. operating temperature.

The liquid slag removed from the furnace system contains approximately 30 pounds of elemental iron and 0.31 pound of elemental copper, both elements being in the oxide form, and 15 pounds of silica per hundred pounds of the sulfidic copper concentrate feed material.

The liquid metal phase in the metal recovery control zone contains about 2 weight percent Fe, which exceeds the control level of 1.8 weight percent Fe shown in Table III as being required to achieve a 99.0% recovery of the copper fed for a feed material containing copper and iron in a one to one ratio. In this example, the 30 weight percent iron and 30 weight percent copper in the feed is a one to one ratio of iron to copper. The dissolved oxygen content of the liquid metal in the metal recovery control zone is 0.018 weight percent, which corresponds to a $p_{CO_2}/p_{CO}$ ratio of 0.77 at 1900° K. The composition and temperature of the effluent gases and the temperature of the liquid slag phase provide a means of controlling the operating conditions in the metal recovery control zone 14.

In this Example 6, an operating temperature level of 1900° K. was selected to be the same as for the other metal/metal oxide systems in Table III. For the copper-iron-copper oxide-iron oxide system, the equilibrium is affected significantly by the operating temperature. For instance, at 1600° K. the $p_{CO_2}/p_{CO}$ ratios for the metal purity control zone and for the metal recovery control zone are 262 (vs. 114 at 1900° K.) and 1.6 (vs. 0.77 at 1900° K.) respectively

EXAMPLE 7

Beneficiated iron ore is pelletized, pre-reduced, and fed, while hot, directly from a reduction kiln (not shown) into a continuously fed electric arc melting furnace (not shown) and then into an apparatus of the type illustrated in FIG 4. Liquid metal containing 99.0% Fe, 0.50% C and 0.50% Si is tapped continuously from the electric arc melting furnace and fed into vessel 51 wherein the metal is maintained at a temperature of 1900° K. This pre-melted feed serves as an agent having reducing potential for reducing FeO from the liquid slag phase into the liquid metal phase.

The liquid product metal from separation one 11 is of approximately 99.99 weight percent purity. For each hundred pounds of metal feed A, approximately 98.90 pounds of liquid product metal is removed which represents a recovery of approximately 99.9 percent of the iron in the feed. The liquid slag removed from separation zone 15 contains approximately 0.127 pounds of FeO and 1.07 pounds of $SiO_2$ for each hundred pounds of metal feed. In addition, the liquid slag contains one pound of a flux containing CaO and $CaF_2$, added in vessel 63, for each hundred pounds of liquid metal feed.

The premelted metal feed reacts with the liquid slag phase flowing from the metal purity control zone 12 so that the silicon and carbon dissolved in the metal feed act as agents having reducing potential for essentially all of the FeO in the slag. For each hundred pounds of liquid metal feed approximately 0.396 pound of silicon is oxidized to 0.85 pound of $SiO_2$ which enters the slag phase and 0.396 pound of carbon is oxidized to produce a CO rich gas while reducing approximately 4.5 pounds of FeO to 3.5 pounds to iron which enters the metal phase. The flux serves to lower the melting point of the nearly pure $SiO_2$ constituting the remainder of the slag phase so that the slag will remain liquid at 1900° K.

The liquid metal, containing dissolved silicon and carbon, is oxidized in the metal purity control zone 12 by adding oxygen. Fuel gas and a nonreactive gas are also added for heat and stirring.

The liquid slag in the metal purity control zone 12 is maintained at a composition such that the weight percent of FeO exceeds the control level of 25.0 weight percent (on a flux-free basis) shown in Table III as being required to obtain a liquid metal product having an iron purity level of about 99.994%. When the FeO is maintained at a level of about 95.0 weight percent (on a flux-free basis), this produces about 4.63 pounds of FeO and 0.22 pound of $SiO_2$ in the slag leaving the vessel 63 for each 100 pounds of liquid metal feed. At the same time, each of the impurities, carbon and silicon, in the product metal are present in an exceedingly low level of under 0.005 weight percent. The $p_{CO_2}/p_{CO}$ ratio in the off-gas from vessel 63 is maintained at about 0.175 by varying the amount of oxygen added through tube 66.

The liquid metal in the metal recovery control zone 14 is maintained at a composition such that carbon and silicon are each maintained at about 0.11 weight percent which exceeds the critical control level of 0.10% shown in Table III for a recovery of 99.9% of the iron in the feed. As an aid in controlling the metal composition so that the carbon and silicon contents exceeds the critical control level, the $p_{CO_2}/p_{CO}$ ratio in the offgas from outlet port 54 is maintained at a level of about 0.018. Such control may be achieved by suitable adjustment of the rate of metalliferous feed to vessel 51 and of oxygen input in the metal purity control zone and, if necessary, by adding a small amount of carbon with the feed.

To lower the phosphorus content of the iron metal, an additional amount of basic flux, such as calcium oxide, may be added in the metal purity control zone 12 with a slight loss in iron recovery.

EXAMPLE 8

Beneficiated iron-manganese ore is pelletized, prereduced and fed, while hot, directly from a reduction kiln (not shown) into a continuously fed electric arc melting furnace (not shown) and then into a furnace system such as shown in FIG. 2 and wherein the same general principles of operation discussed in Example 1 are employed. Liquid metal containing 91.67 pounds of iron and 8.33 pounds of manganese per hundred pounds of iron plus manganese is fed continuously through tube 52 into vessel 51, the metal being maintained at a temperature of 1900° K. This premelted feed which also contains carbon in solution serves as an agent having potential for reducing FeO from the liquid slag phase into the liquid metal phase.

The liquid metal product from vessel 68 is approximately 99.98 weight percent iron. For each hundred pounds of iron plus manganese in the liquid metal feed, approximately 90.768 pounds of liquid product metal containing 90.75 pounds of iron and 0.018 pound of manganese, is removed which represents a recovery of approximately 99.0% of the iron in the feed.

The removed liquid slag contains approximately 10.73 pounds of MnO and 1.18 pounds of FeO for each hundred pounds of iron plus manganese in the feed.

The premelted metal material fed through tube 52 reacts with the liquid slag phase flowing from the intermediate zone 13 so that the manganese and carbon dissolved in the metal feed act as agents having reducing potential for all but a small amount of the FeO in the slag. For each hundred pounds of manganese plus iron in the liquid metal feed approximately 8.31 pounds of manganese is oxidized and at least some of the FeO in the slag is reduced. Some of the FeO is also reduced by carbon in the liquid metal feed and, if necessary, some additional carbon may be added with the liquid metal feed.

Most of the dissolved manganese and carbon in the liquid metal is oxidized in the metal purity control zone 12 by adding oxygen. If required for added fluidity of slag a non-reactive flux, such as fluorspar, may be added through tube 64 in vessel 63.

The liquid slag in the metal purity control zone 12 is maintained at a composition such that the weight percent of FeO exceeds the critical control level of 94.2% FeO (on a flux-free basis) shown in Table III as being required to obtain a liquid metal product having an iron purity level of about 99.98 weight percent. When the FeO is maintained at a level of about 95.0 percent (on a flux-free basis) this results in oxidation of all but about 0.02% of the carbon plus manganese present in the metal phase entering the metal purity control zone 12.

In the intermediate zone 13, which may consist of two or more vessels 39, oxygen is added so that the manganese and carbon contents in metal entering the metal purity control zone 12 are already at such a low level that an excessive amount of refluxing of the iron in the metal phase back into the slag phase as FeO, is avoided.

The liquid metal in the metal recovery control zone 14 is maintained at a composition such that the content of manganese is about 3.2 weight percent manganese which exceeds the critical control level of 2.9 percent manganese shown in Table III for a recovery of 99.0% of the iron in the feed.

Utilizing the apparatus of FIG. 5, the liquid slag leaving the furnace system shown in FIG. 2 is fed continuously as oxidic feed into a secondary metal recovery control zone 74. This slag contains 8.31 pounds of manganese as MnO and 0.92 pounds of iron as FeO for each hundred pounds of iron plus manganese fed into the furnace system shown in FIG. 2. Most of the endothermic heat needed for reducing essentially all of the oxide feed into the liquid metal phase is provided by a carbon arc (not shown) or by induction heating (not shown). To provide an adequate amount of an agent having reducing potential for the MnO and FeO, carbon is added through tube 78. With reference to FIG. 5, oxygen, together with natural gas and nonreactive gas, if necessary, are introduced through tube 79 to provide agitation and some of the endothermic heat.

Liquid metal product leaving metal separation zone 11 has a composition of about 89.8% manganese and 10.2% iron on a carbon-free basis.

The slag leaving slag separation zone 15 consists mainly of flux or gangue materials remaining after most of the manganese and iron have been reduced to form the liquid metal product.

While there have been shown and described hereinabove possible embodiments of this invention, it is to be understood that the invention is not limited thereto and that various changes, alterations and modifications can be made thereto without departing from the spirit and scope thereof as defined in the appended claims.

We claim:
1. A continuous process for separating and recovering in a furnace system a desired metal element from a metalliferous feed material containing the desired metal element and at least one more oxidizable metal element which comprises: (a) establishing in the furnace system a metal separation zone, metal purity control zone, a metal recovery control zone and a slag separation zone; (b) maintaining in all zones of step (a) a liquid metal phase containing the desired metal element and at least one more oxidizable metal element and a liquid oxidic slag phase containing an oxide of the desired metal element and an oxide of at least one more oxidizable metal element, said liquid slag and liquid metal phases each flowing in a respective distinct path extending between the metal separation zone and the slag separation zone and inclusive of the metal purity control zone and the metal recovery control zone, said liquid slag phase flowing in a continuous sequentially from the metal separation zone through the metal purity control zone through the metal recovery control zone to the slag separation zone and said liquid metal phase flowing from the slag separation zone to the metal separation zone countercurrently to the liquid slag phase in each of said four named zones, said liquid slag and liquid metal phases being in contact with each other in each of said four named zones; (c) maintaining sufficiently quiescent conditions in said slag separation zone so that said liquid oxidic slag and liquid metal phases form a distinct interface; (d) introducing into at least one of the flow paths the metalliferous material containing the desired metal element and the more oxidizable metal element, said metalliferous material selected from the group consisting of ores, concentrates, alloys and combinations thereof; (e) maintaining said sequential flow of the liquid slag through each of said four named zones by introducing into the furnace system an oxidizing agent, that contains sufficient available oxygen for oxidizing the more oxidizable metal element or elements, at least some of said oxidizing agent being added to the metal purity control zone, said slag carrying a significant portion of the desired metal in oxide form; (f) maintaining a flow of liquid metal by introducing into the furnace system a reducing agent that contains sufficient available reducing potential for reducing the oxide of the desired metal element, at least some of said reducing agent being added in the metal recovery control zone; (g) controlling the concentration of the oxide of the desired metal element in the slag phase of the metal purity control zone at a substantial predetermined level at which the ratio of the weight of the oxide of the desired metal to the combined weight of the oxide or oxides of the more oxidizable metal element or elements exclusive of oxides of more oxidizable metal flux elements is at least one to three in the slag phase of the metal purity control zone by regulating said oxidizing agent introduced into said zone at a sufficient quantity and under sufficient agitation to drive the more oxidizable metal element or elements and at least a portion of hte desired metal element into the slag phase thereby forming a product of the desired metal element at high purity in the metal phase; (h) controlling the composition of the more oxidizable metal element or elements in the metal phase of the metal recovery control zone at significant predetermined levels by regulating said reducing agent introduced into said zone at a sufficient quantity under sufficient high agitation to obtain a high recovery of the desired metal element; (i) removing the desired metal element in a molten metal stream in high purity from the metal separation zone; and (j) removing liquid slag impoverished in the oxide of the desired metal element from the slag separation zone.

2. A process according to claim 1 wherein an intermediate zone is established along the paths between the metal purity control zone and the metal recovery control zone and the liquid slag and liquid metal phases flow through said intermediate zone in intimate contact with each other.

3. A process according to claim 1 wherein the slag impoverished in the oxide of the desired metal is treated to recover one or more of the more oxidizable elements of a metallic type present therein.

4. A process according to claim 1 wherein the metalliferous feed material, prior to introduction into the furnace system, is premelted.

5. A process according to claim 1 wherein the metalliferous feed material, prior to introduction into the furnace system, is premelted and treated to obtain one or more of the elements therein as liquid metal, which metal is separated from the material prior to introduction of the remainder of the metalliferous material into the furnace system.

6. A process according to claim 5 wherein the metalliferous feed material is a copper concentrate containing gold and silver and the metal separated after said treatment is an alloy of gold and silver in a portion of the copper.

7. A process according to claim 1 wherein the metalliferous feed material is an ore or ore concentrate and at least a portion of the metalliferous feed material, prior to introduction into the furnace system, is reduced to metal.

8. A process according to claim 1 wherein prior to introduction into the furnace system, the metalliferous feed material includes a sulfidic material which is oxidized to remove sulfur and to convert the sulfidic material to an oxidic material which is premelted and then is introduced into the furnace system.

9. A process according to claim 1 wherein the metalliferous feed material is an iron rich oxidic material which is premelted to recover substantially all of the iron as liquid metal prior to introduction of said liquid metal into the furnace system.

10. A process according to claim 9 wherein the iron rich oxidic material also includes manganese, and substantially all of the manganese is recovered from the premelting operation with the iron as liquid metal.

11. A process according to claim 1 in which in step (h) a significant portion of the oxide of the desired metal element is reduced by said reducing agent and thereby driven into the metal phase.

12. A process according to claim 11 in which a significant portion of the oxides of the more oxidizable elements along with the desired metal element oxide are reduced and thereby driven into the metal phase.

13. A process according to claim 1 wherein the metalliferous material is an ore containing nickel oxide and iron oxide and the desired metal element is nickel.

14. A process according to claim 1 wherein the metalliferous material is a lateritic nickel ore and the desired metal element is nickel.

15. A process according to claim 1 wherein the metalliferous material is a ferronickel alloy and the desired metal element is nickel.

16. A process according to claim 1 wherein the metalliferous material is an oxidic iron bearing material and the desired metal element is iron.

17. A process according to claim 1 wherein the metalliferous material is an oxidized sulfidic concentrate containing copper and iron and the desired metal element is copper.

18. A process according to claim 1 wherein the metalliferous material is a lateritic nickel ore and the desired metal element is nickel and a portion of the slag removed in step (j) is employed as a secondary metalliferous material and subjected to the treatment steps (a)–(j) of claim 1 to separate one or more other elements of a metallic type.

19. A process as in claim 18 in which said secondary metalliferous material treatment is repeated to obtain separately cobalt-nickel-iron alloy, iron, and a chromium-manganese-iron alloy.

20. A process according to claim 1 wherein a flux is added to the slag phase.

21. A process according to claim 20 wherein the flux is added in the metal purity control zone.

22. A process according to claim 2 wherein a portion of said oxidizing agent is distributed in the intermediate zone.

23. A process according to claim 2 wherein a portion of said reducing agent is distributed in the intermediate zone.

24. A process according to claim 2 wherein portions of said reducing and oxidizing agents are distributed in the intermediate zone.

25. A process as in claim 1 carried out in a single reaction vessel in which the liquid slag and liquid metal phases flow substantially countercurrently in continuous contact with each other.

26. A process as in claim 1 in which the metal purity control zones and metal recovery control zone are in distinct communicating vessels and in at least a portion of the flow paths the liquid metal and liquid slag phases do not contact each other.

27. A continuous process for separating and recovering in a furnace system a desired metal element from a metalliferous material containing the desired metal element and at least one more oxidizable metal element which comprises: (a) establishing in the furnace system a metal separation zone, metal purity control zone, metal recovery control zone and an intermediate zone located between said two last named zones, and a metal separation zone; (b) maintaining a liquid metal phase containing the desired metal element and at least one more oxidizable element and a liquid oxidic slag phase containing an oxide of the desired metal element and an oxide of at least one more oxidizable metal element, said liquid slag and liquid metal phases each flowing in a respective distinct path extending between and including in respective paths the metal separation zone and the slag separation zone, said liquid slag phase flowing from the metal separation zone through the metal purity control zone, the intermediate zone through the metal recovery control zone, to the slag separation zone and said liquid metal phase flowing from the slag separation zone through the metal recovery control zone, intermediate zone, the metal purity control zone, to the metal separation zone, the liquid slag and liquid metal phases being in intimate contact with each other in each of said five named zones; (c) maintaining sufficiently quiescent conditions in said slag separation zone so that said liquid oxidic slag and liquid metal phases form a distinct interface; (d) introducing into at least one of the flow paths the metalliferous material containing the desired metal element and the more oxidizable metal element, said metalliferous material selected from the group consisting of ores, concentrates, alloys and combinations thereof; (e) maintaining said sequential flow of the liquid slag through each of said five named zones by introducing into the furnace system an oxidizing agent, that contains sufficient available oxygen for oxidizing the more oxidizable metal element or elements, at least some of said oxidizing agent being added in the metal purity control zone, said slag carrying a significant portion of the desired metal in oxide form; (f) maintaining a flow of liquid metal by introducing into the furnace system a reducing agent that contains sufficient available reducing potential for reducing the oxide of the desired metal element, at least some of said reducing agent being added in the metal recovery control zone; (g) controlling the concentration of the oxide of the desired metal element in the slag phase of the metal purity control zone at a substantial predetermined level at which the ratio of the weight of the oxide of the desired metal to the combined weight of the oxide or oxides of the more oxidizable metal element or elements exclusive of oxides of more oxidizable metal flux elements is at least one to three in the slag phase of the metal purity control zone by regulating said oxidizing agent introduced into said zone at a sufficient quantity and under sufficient agitation to drive the more oxidizable metal element or elements and at least a portion of the desired metal element into the slag phase thereby forming a product of the desired metal element at high purity in the metal phase; (h) controlling the composition of the more oxidizable metal element or elements in the metal phase of the metal recovery control zone at significant predetermined levels by regulating said reducing agent introduced into said zone at a sufficient quantity under sufficient high agitation so that at least 99% of the desired metal element fed to the system is recovered; (i) removing the desired metal element in a molten metal stream in high purity from the metal separation zone; and (j) removing liquid slag impoverished in the oxide of the desired metal element from the slag separation zone.

28. A process as in claim 27 in which the metal purity control zone, metal recovery control zone, and intermediate zone are in distinct communicating vessels and in at least a portion of the flow paths the liquid metal and liquid slag phases do not contact each other.

29. A continuous process for separating and recovering in a furnace system including an elongated vessel a desired metal element from a metalliferous material containing the desired metal element and at least one more oxidizable metal element which comprises: (a) establishing in the elongated vessel a metal separation zone, metal purity control zone, a metal recovery control zone, and an intermediate zone located between and in contact with said metal purity control zone and said metal recovery control zone and a slag separation zone; (b) maintaining in said zones of step (a) a liquid metal phase containing the desired metal element and at least one more oxidizable metal element and a liquid oxidic slag phase containing an oxide of the desired metal element and an oxide of at least one more oxidizable metal element, said liquid slag and liquid metal phases each flowing in a respective distinct path extending between and including in respective paths the metal separation zone and the slag separation zone, said liquid slag phase flowing from the metal separation zone through the metal purity control zone, the intermediate zone through the metal recovery control zone, to the slag separation zone and said liquid metal phase flowing from the slag separation zone through the metal recovery control zone, intermediate zone, the metal purity control zone, to the metal separation zone, the liquid slag and liquid metal phases being in intimate contact with each other in each of said five named zones, (c) maintaining sufficiently quiescent conditions in said slag separation zone so that said liquid oxidic slag and liquid metal phases form a distinct interface; (d) introducing into at least one of the flow paths the metalliferous material containing the desired metal element and the more oxidizable metal element, said metalliferous material selected from the group consisting of ores, concentrates, alloys and combinations thereof; (e) maintaining said sequential flow of the liquid slag through each of said five named zones by introducing into the furnace system an oxidizing agent, that contains sufficient available oxygen for oxidizing the more oxidizable metal element or elements, at least some of said oxidizing agent being added in the metal purity control zone, said slag carrying a significant portion of the desired metal in oxide form; (f) maintaining a flow of liquid metal by introducing into the furnace system a reducing agent that contains sufficient available reducing potential for reducing the oxide of the desired metal element, at least some of said reducing agent being added in the metal recovery control zone; (g) controlling the concentration of the oxide of the desired metal element in the slag phase of the metal purity control zone at a substantial predetermined level at which the ratio of the weight of the oxide of the desired metal to the combined weight of the oxide or oxides of the more oxidizable metal element or elements exclusive of oxides of more oxidizable metal flux elements is at least one to three in the slag phase of the metal purity control zone by regulating said oxidizing agent introduced into said zone at a sufficient quantity and under sufficient agitation to drive the more oxidizable metal element or elements and at least a portion of the desired metal element into the slag phase thereby forming a product of the desired metal element at high purity in the metal phase; (h) controlling the composition of the more oxidizable metal element or elements in the metal phase of the metal recovery control zone at significant predetermined levels by regulating said reducing agent introduced into said zone at a sufficient quantity under sufficient high agitation so that at least 99% of the desired metal element fed to the system is recovered; (i) removing the desired metal element in a molten metal stream in high purity from the metal separation zone; and (j) removing liquid slag impoverished in the oxide of the desired metal element from the slag separation zone.

30. A process according to claim 29 wherein interphase contact and intraphase mixing between the liquid metal phase and liquid slag phase during their respective flows between the metal purity control zone and metal recovery control zone is promoted to effect a progressive increase of the desired metal purity of the liquid metal phase as it proceeds from the metal recovery control zone to the metal purity control zone.

31. A process according to claim 1 in which iron is the desired metal element and the more oxidizable elements include phosphorus impurities and in which a basic flux is added in the metal purity control zone to react with the phosphorus to form a product in the slag phase.

32. A process according to claim 1 wherein the desired metal element removed in a liquid metal phase from the metal purity control zone is iron with phosphorus impurity which liquid metal is fed to an impurity separation zone to which a basic flux and an oxidizing agent are added to react with the phosphorus to form a slag phase in which phosphorus is removed and to form a metal phase of iron with a low phosphorus content.

33. A process according to claim 1 in which copper is the desired metal element and the more oxidizable elements include impurities selected from the group consisting of arsenic, antimony, bismuth and combinations thereof and in which a basic flux is added to the metal purity control zone to react with the impurities to form an oxidic product removed in the slag phase and to form a metal phase of copper with a low content of said impurities.

34. A process according to claim 1 wherein the desired metal element removed in a liquid metal phase from the metal purity control zone is copper with impurities selected from the group consisting of arsenic, antimony, bismuth and combinations thereof, which liquid metal is fed to an impurity separation zone to which a basic flux and an oxidizing agent are added to react with the impurities to form a slag phase in which impurities are removed and to form a metal phase of copper with low content of impurities.

35. A process for separating and recovering in a furnace system a desired metal element in one stream and a more oxidizable metal element in a second stream from a metalliferous feed material containing both elements which comprises: (a) establishing in the furnace system a desired metal purity control zone, a desired metal recovery control zone, and a more oxidizable metal yield zone; (b) maintaining in said desired metal purity control zone a liquid metal phase containing the desired metal element and at least one more oxidizable metal element and a liquid slag phase containing an oxide of the desired metal element and an oxide of at least one more oxidizable metal element, said liquid slag and liquid metal phases each flowing in a respective distinct path extending between and inclusive of the desired metal purity control zone and the desired metal recovery control zone, said liquid slag phase flowing from the desired metal purity control zone to the desired metal recovery control zone and said liquid metal phase flowing from the desired metal recovery control zone to the desired metal purity control zone, said liquid slag and liquid metal phases being in contact with each other in at least the desired metal purity control zone and the desired metal recovery control zone; (c) introducing into at least one of the flow paths of step (b) the metalliferous material containing the desired metal element, said metalliferous material selected from the group consisting of ores, concentrates, alloys and combinations thereof; (d) maintaining a flow of the liquid slag from the desired metal purity control zone to the desired metal recovery control zone by introducing into the furnace system an oxidizing agent that contains sufficient available oxygen for oxidizing the more oxidizable metal elements, at least some of said oxidizing agent being added in the desired metal purity control zone; (e) maintaining a flow of liquid metal by introducing into the furnace system a reducing agent, that contains sufficient available reducing potential for reducing the oxide of the desired metal element, at least some of said reducing agent being added in the desired metal recovery control zone; (f) controlling the concentration of the oxide of the desired metal element in the slag phase of the desired metal purity control zone at a substantial predetermined level by regulating the amount of said oxidizing agent introduced into said zone to drive the more oxidizable elements into the slag phase thereby forming a product of the desired metal element at high purity in the metal phase; (g) controlling the concentrations of the more oxidizable elements in the metal phase of the desired metal recovery control zone at significant predetermined levels by regulating the amount of the reducing agent introduced into said zone to ensure a high recovery of the desired metal element; (h) removing the desired metal element product from the desired metal purity control zone; (i) directing liquid slag impoverished in the oxide of the desired metal element and rich in the oxide of the more oxidizable metal elements from the desired metal recovery control zone into said more oxidizable metal yield zone; (j) introducing a reducing agent into said more oxidizable metal yield zone to form a metal phase of the more oxidizable metal element in contact with the slag phase therein; (k) removing said more oxidizable metal element from said more oxidizable metal yield zone; and (l) removing said slag impoverished in the oxides of the desired metal element and the more oxidizable element from said more oxidizable metal yield zone.

36. A process as in claim 35 including an intermediate zone between said desired metal purity control zone and desired metal recovery control zone.

37. A process as in claim 35 in which said slag forms a continuous phase from said desired metal recovery control zone to said more oxidizable metal yield zone and said metal phase in said former zone is maintained separate from the metal phase in said latter zone.

38. A process as in claim 37 in which the desired metal element and more oxidizable metal element are recovered in separate streams from a single vessel.

39. A process as in claim 38 in which the slag phase and metal phase flow concurrently in said more oxidizable metal yield zone and the more oxidizable metal element is removed from a downstream portion thereof.

40. A process as in claim 38 in which the slag phase and metal phase flow countercurrently in said more oxidizable metal yield zone and the more oxidizable metal element is removed from an upstream portion of said zone near said desired metal recovery control zone.

41. A process as in claim 38 in which said separation is formed by adjusting the flow rates of the metal phases in said two zones so that a neutral flow zone separates the liquid metal flow in each zone.

42. A process as in claim 38 in which said separation is formed by a physical dam preventing flow between said liquid metal phases but permitting flow between said slag phases.

43. A process according to claim 1 in which at least on the order of 99% of the desired metal element fed to the system is recovered.

44. A process according to claim 43 in which said 99% recovery of desired metal element of step (h) is withdrawn from the metal separation zone.

45. A process according to claim 35 in which step (g) is carried out so that at least about 99% of the desired metal element fed to the system is recovered.

46. A continuous process for separating and recovering in a furnace system from a primary metalliferous feed material a desired metal element and at least one more oxidizable metal element which comprises: (a) establishing in the furnace system a first stage comprising a first metal purity control zone and a first metal recovery control zone; (b) maintaining in said last named zones a liquid metal phase containing the desired metal element and at least one more oxidizable metal element and a liquid oxidic slag phase containing an oxide of the desired metal element and an oxide of at least one more oxidizable element, said last named liquid slag and liquid metal phases each flowing in a respective distinct path extending between and inclusive of the first metal purity control zone and the first metal recovery control zone, said liquid slag phase flowing from the first metal purity control zone to the first metal recovery control zone and said liquid metal phase flowing from the first metal recovery control zone to the first metal purity control zone, said liquid slag and liquid metal phases being in contact with each other in at least the first metal purity control zone and the first metal recovery control zone; (c) introducing into at least one of the flow paths the primary metalliferous material containing the desired metal element, said primary metalliferous material selected from the group consisting of ores, concentrates, alloys and combinations thereof; (d) maintaining a flow of the liquid slag by introducing into the first stage an oxidizing agent that contains sufficient available oxygen for oxidizing the more oxidizable metal element, at least some of said oxidizing agent being added in the first metal purity control zone; (e) maintaining a flow of liquid metal by introducing into the first stage a reducing agent that contains sufficient available reducing potential for reducing the oxide of the desired metal element, at least some of said reducing agent being added in the first metal recovery control zone; (f) controlling the concentration of the oxide of the desired metal element in the slag phase of the first metal purity control zone at a substantial predetermined level by regulating the amount of said oxidizing agent introduced into said zone thereby forming a product of the desired metal element at high purity in the metal phase; (g) controlling the concentrations of the more oxidizable metal element in the metal phase of the first metal recovery control zone at a significant predetermined level by regulating the amount of said reducing agent introduced into said zone to obtain a high recovery of the desired metal element; (h) removing the desired metal element product from the first metal purity control zone; (i) removing liquid slag containing oxide of the more oxidizable metal element impoverished in the oxide of the desired metal element from the first metal recovery control zone; (j) feeding at least a portion of the slag removed from step (i) as a secondary metalliferous material into a second stage comprising a second metal purity control zone and a second metal recovery control zone; (k) subjecting the secondary metalliferous material to the treatment steps (b)–(g); and (l) removing the more oxidizable metal element in elemental or alloy form in a metal stream from the second metal purity control zone.

47. A method as in claim 46 in which at least a portion of the liquid slag is removed from the second metal recovery control zone and fed as a tertiary metalliferous feed material to a third stage comprising a third metal purity control zone and a third metal recovery control zone in which the tertiary metalliferous feed material is subjected to the treatment steps (b)–(g) of claim 1 and the more oxidizable metal element is removed in a metal stream from the third metal purity control zone.

48. A process according to claim 46 wherein the primary metalliferous feed material is a lateritic nickel ore, the desired metal element is nickel, and the more oxidizable metal element is iron.

49. A process according to claim 48 in which the more oxidizable metal element is removed from the second metal purity control zone as a cobalt nickel iron alloy.

50. A process according to claim 47 in which the primary metalliferous feed material is a lateritic nickel ore, the desired metal element is nickel, the more oxidizable metal element is removed from the second metal purity control zone as a cobalt nickel iron alloy and is removed from the third metal purity control zone as elemental iron.

References Cited
UNITED STATES PATENTS

| | | | |
|---|---|---|---|
| 1,976,735 | 10/1934 | Kuzell | 75—74 X |
| 2,572,489 | 10/1951 | Jordan | 75—45 X |
| 2,668,107 | 2/1954 | Gordon | 75—74 |
| 2,758,022 | 8/1956 | Jordan | 75—76 |
| 3,258,330 | 6/1966 | Ito | 75—76 X |
| 3,437,475 | 4/1969 | Themelis | 75—76 |
| 3,503,735 | 3/1970 | Beggs | 75—82 X |
| 3,535,105 | 10/1970 | Archibald | 75—82 X |
| 3,326,671 | 8/1966 | Worner | 75—40 |

FOREIGN PATENTS

| | | | |
|---|---|---|---|
| 1,128,719 | 10/1968 | Great Britain | 75—85 |

L. DeWAYNE RUTLEDGE, Primary Examiner

J. E. LEGRU, Assistant Examiner

U.S. Cl. X.R.

75—40, 63, 72, 80, 82, 83, 89, 129, 130.5, 135

PO-1050
(5/69)

UNITED STATES PATENT OFFICE
CERTIFICATE OF CORRECTION

Patent No. 3,723,096     Dated March 27, 1973

Inventor(s) Norman A. Parlee and William E. Mahin

It is certified that error appears in the above-identified patent and that said Letters Patent are hereby corrected as shown below:

Col. 3, line 29, after "reducing" delete "portential" and insert "potential"; Col. 4, line 5, after "is" delete "sepaarted" and insert "separated"; Col. 18 in Table III, under Col. entitled "Metal recovery control zone", fourth section down, after "Ni-Co-Fe___" delete "Ni-C-Fe" and insert "Ni-Co-Fe"; Col. 21, line 48 before "in" insert "("; Col. 33, line 8, after "ous" and before "sequentially" insert "path"; Col. 33, line 47, after "of" delete "hte" and insert "the"; Col. 34, line 22, after "is" delete "premelted" and insert "presmelted"; Col. 34, line 28, before "operation" delete "melting" and insert "smelting"; Col. 40, line 17, after "claim" delete "1" and insert "46".

Signed and sealed this 19th day of February 1974.

(SEAL)
Attest:

EDWARD M. FLETCHER, JR.     C. MARSHALL DANN
Attesting Officer        Commissioner of Patents